United States Patent
Chen et al.

(10) Patent No.: US 12,346,370 B2
(45) Date of Patent: Jul. 1, 2025

(54) VISUAL INTENT TRIGGERING FOR VISUAL SEARCH

(71) Applicant: Microsoft Technology Licensing, LLC, Redmond, WA (US)

(72) Inventors: Xi Chen, Bellevue, WA (US); Houdong Hu, Redmond, WA (US); Li Huang, Sammamish, WA (US); Jiapei Huang, Seattle, WA (US); Arun Sacheti, Sammamish, WA (US); Linjun Yang, Sammamish, WA (US); Rui Xia, Vancouver (CA); Kuang-Huei Lee, Redmond, WA (US); Meenaz Merchant, Kirkland, WA (US); Sean Chang Culatana, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1080 days.

(21) Appl. No.: 16/036,224

(22) Filed: Jul. 16, 2018

(65) Prior Publication Data

US 2020/0019628 A1    Jan. 16, 2020

(51) Int. Cl.
G06F 16/50     (2019.01)
G06F 16/353    (2025.01)
(Continued)

(52) U.S. Cl.
CPC ............ *G06F 16/50* (2019.01); *G06F 16/353* (2019.01); *G06F 16/583* (2019.01); *G06F 18/24* (2023.01);
(Continued)

(58) Field of Classification Search
CPC ........ G06N 3/08; G06N 20/00; G06F 16/353; G06F 16/583; G06F 16/35; G06F 16/50; G06K 9/6267; G06T 2210/12
See application file for complete search history.

(56) References Cited

U.S. PATENT DOCUMENTS 8,489,627 B1    7/2013  Brandt
9,489,403 B2   11/2016  Eskolin et al.
(Continued)

FOREIGN PATENT DOCUMENTS

CN    106255968 A    12/2016
CN    107358264 A    11/2017
(Continued)

OTHER PUBLICATIONS

Li Fei-Fei, "Learning Generative Visual Models from Few Training Examples: An Incremental Bayesian Approach Tested on 101 Object Categories," 2004 Conference on Computer Vision and Pattern Recognition Workshop, 2004, pp. 178-178, doi: 10.1109/CVPR.2004.383. (Year: 2004).*

(Continued)

*Primary Examiner* — Michael J Huntley
*Assistant Examiner* — Imad Kassim
(74) *Attorney, Agent, or Firm* — CALFEE, HALTER & GRISWOLD LLP

(57) ABSTRACT

Representative embodiments disclose mechanisms to perform visual intent classification or visual intent detection or both on an image. Visual intent classification utilizes a trained machine learning model that classifies subjects in the image according to a classification taxonomy. The visual intent classification can be used as a pre-triggering mechanism to initiate further action in order to substantially save processing time. Example further actions include user scenarios, query formulation, user experience enhancement, (Continued)

and so forth. Visual intent detection utilizes a trained machine learning model to identify subjects in an image, place a bounding box around the image, and classify the subject according to the taxonomy. The trained machine learning model utilizes multiple feature detectors, multi-layer predictions, multilabel classifiers, and bounding box regression.

17 Claims, 15 Drawing Sheets

(51) Int. Cl.
*G06F 16/583* (2019.01)
*G06F 18/24* (2023.01)
*G06N 3/08* (2023.01)
*G06N 20/00* (2019.01)

(52) U.S. Cl.
CPC .............. *G06N 3/08* (2013.01); *G06N 20/00* (2019.01); *G06T 2210/12* (2013.01)

(56) References Cited

U.S. PATENT DOCUMENTS

| | | | |
|---|---|---|---|
| 2011/0129153 | A1 | 6/2011 | Petrou et al. |
| 2015/0170001 | A1 | 6/2015 | Rabinovich |
| 2015/0331929 | A1* | 11/2015 | El-Saban ............ G06F 16/3329 707/739 |
| 2016/0125274 | A1 | 5/2016 | Zhou et al. |
| 2016/0350333 | A1 | 12/2016 | Sacheti et al. |
| 2017/0185602 | A1* | 6/2017 | Gusev ................... G06F 16/951 |
| 2017/0364757 | A1* | 12/2017 | Rajabizadeh ............ G06N 3/08 |
| 2018/0189951 | A1* | 7/2018 | Liston ..................... G06T 7/194 |

FOREIGN PATENT DOCUMENTS

| | | |
|---|---|---|
| WO | 2015175736 A1 | 11/2015 |
| WO | 2017100334 A1 | 6/2017 |

OTHER PUBLICATIONS

Pons et al., "Multi-task, multi-label and multi-domain learning with residual convolutional networks for emotion recognition", Feb. 19, 2018, (Year: 2018).*
Simonyan et al. "MobileNets: Efficient Convolutional Neural Networks for Mobile Vision Applications", 2017, Google Inc. (Year: 2017 ).*
Zhai et al. ("Visual Discovery at Pinterest", Apr. 7, 2017). (Year: 2017).*
Zhang et al. ("TapTell: Interactive visual search for mobile task recommendation", (2015) 114-124) (Year: 2015).*
Zhang et al. ("Multi-label Image Classification with Regional Latent Semantic Dependencies ", arXiv, Mar. 12, 2017) (Year: 2017).*
Zha et al. ("Visual Query Suggestion: Towards Capturing User Intent in Internet Image Search", vol. 6, No. 3, Article 13, Publication date: Aug. 2010) (Year: 2010).*
Soleymani et al. ("Multimodal Analysis of Image Search Intent", ICMR'17, Jun. 6-9, 2017, Bucharest, Romania) (Year: 2017).*
Kang et al. ("Object Detection from Video Tubelets with Convolutional Neural Networks" IEEE, 2016) (Year: 2016).*
"Very Deep Convolutional Networks for Large-Scale Image Recognition" by Karen Simonyan et al. Apr. 10, 2015, 14 pages.
"MobileNets: Efficient Convolutional Neural Networks for Mobile Vision Applications" by Andrew G. Howard et al. Apr. 17, 2017, 9 pages.
"International Search Report and Written Opinion Issued in PCT Application No. PCT/US2019/037582", Mailed Date: Sep. 20, 2019, 11 Pages.
"Office Action Issued in European Patent Application No. 19740440. 3", Mailed Date: Sep. 14, 2022, 6 Pages.
"Office Action Issued in Indian Patent Application No. 202047055073", Mailed Date: Sep. 27, 2022, 7 Pages.
First Office Action Received for Chinese Application No. 201980047024.3, mailed on Jan. 30, 2024, 13 pages (English Translation Provided).
Summons to attend oral proceedings pursuant to Rule 115(1) Received in European Patent Application No. 19740440.3, mailed on Feb. 27, 2025, 12 pages.
Decision to refuse a European patent application (Art. 97(2) Received in European Patent Application No. 19740440.3, mailed on May 13, 2025, 04 pages.

* cited by examiner

VISUAL INTENT TRIGGERING FOR VISUAL SEARCH

FIELD

This application relates generally to search systems. More specifically, in some aspects, this application relates to ascertaining visual intent as part of a non-visual search, a visual search, or other user scenarios.

BACKGROUND

The current pipeline of most visual search engines is given an image, find visually and semantically similar images. This is most often accomplished by comparing feature vectors in the matching set and then returning the images that best match through various levels of ranking. This tends to be very expensive in terms of execution time, resources or other cost measures and sometimes returns unrelated results.

It is within this context that the present embodiments arise.

DETAILED DESCRIPTION

Figure 1:
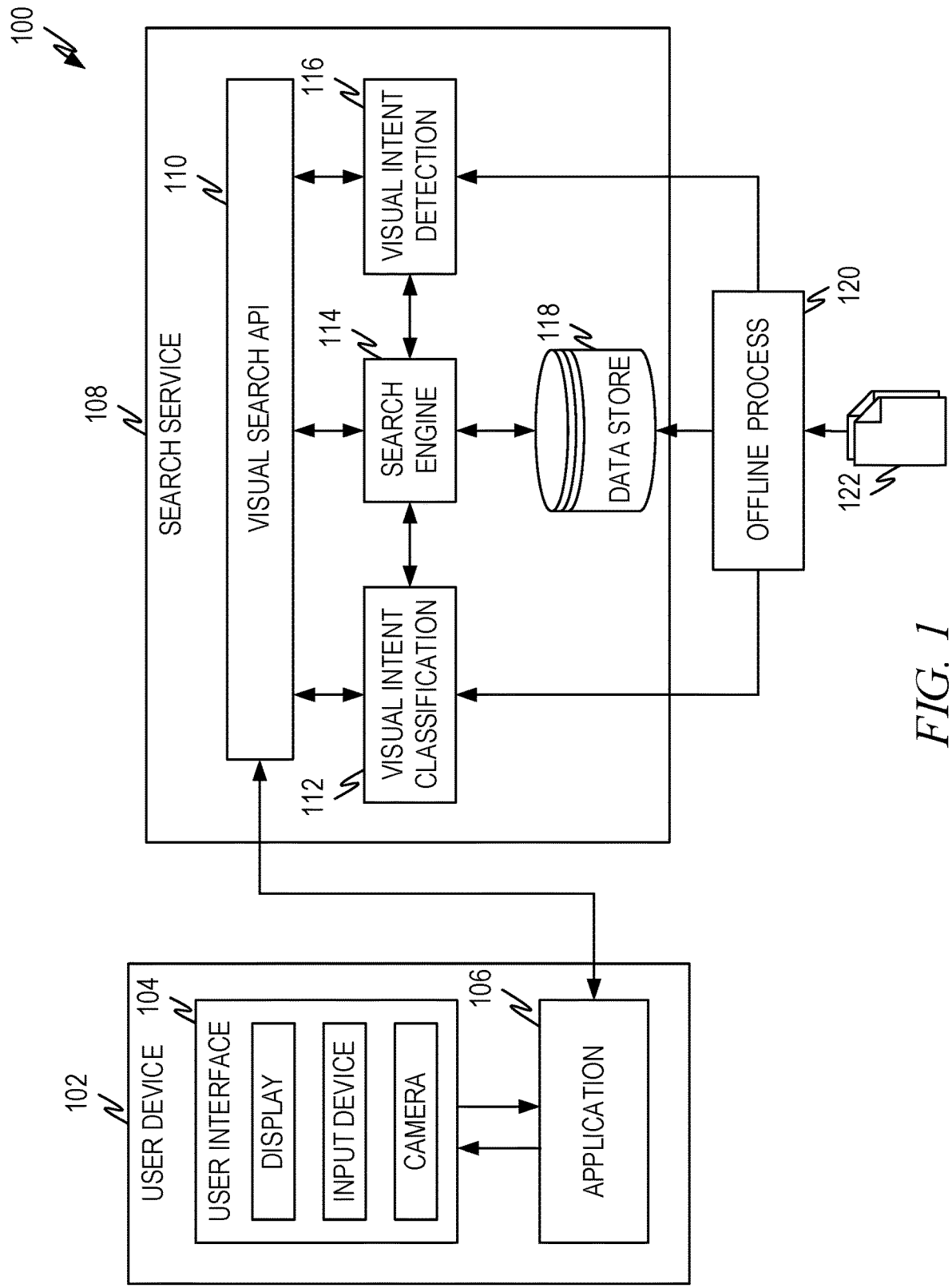
FIG. 1 is a representative diagram illustrating a representative architecture according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

The current processing pipeline for most visual image search engines is to take a search image and compare it to every image in a data store to find visually and semantically relevant images through comparing feature vectors of the search image to feature vectors of the images in the image database to find candidate matches. The candidate matches are then put through multiple levels of ranking in order to find the "best" matches, which are then returned as relevant to the search image.

There are two problems with this traditional approach. First, as the number of images in the data store increases, the computational time to compare the feature vector of the search image to feature vectors of the images in the data store increases dramatically. This means that traditional methods of visual search are computationally very expensive in terms of execution costs, memory costs, data storage costs, and so forth.

The second problem associated with the traditional approach is that because matching is done on feature vectors, the algorithm sometimes returns images that are unrelated to the search images. This is because sometimes unrelated images have similar feature vectors.

Embodiments of the present disclosure solve these two technical problems and can result in a dramatic reduction in computational time, up to a 97% reduction in one representative example.

Embodiments of the present disclosure include visual intent classification or visual intent detection or both. Visual intent classification receives a source image and returns multiple classification labels that exist in the source image. For example, a source image may include multiple subjects (items that are included in the source image) such as a vehicle, an animal, a person, and so forth. The visual intent classification model evaluates the source image and returns taxonomy categories that correspond to the subjects in the source image.

The taxonomy categories identify what is in the source image and can then be used to trigger additional actions. In this sense, the visual intent classification model can be utilized as a pre-triggering evaluation to identify what likely actions a user may want to take regarding the subjects in the image. For example, a user may wish to search for semantically or visually related images as in traditional visual search systems.

However, such a use case is only a single example. The pre-triggering capability of the visual intent classifier extends well beyond such a narrow use case. The content of the image can be used to define a set of potential use cases. For example, a source image containing a packaged consumer product gives rise to a different set of user cases than a source image containing a landmark or natural object. Thus, the categories can be used, along with other information, to identify different possible scenarios that the user may wish to trigger.

For example, if the image contains a packaged consumer product, the user may wish to know more about the product, may wish to know where to purchase the product, may wish to know instructions for use, or identify the user manual, or any number of other things. The actions a user may wish to perform with a packaged consumer product can differ substantially for actions a user may wish to perform when the source image is, for example, of a landmark or other man-made structure.

Thus, visual intent classification can be used in such use cases as helping trigger a particular user scenario based on the content of an image, detecting and recognizing everyday objects in order to help a user better formulate a query that will match what the user desires to find, and/or helping improve the user experience.

Visual intent detection utilizes a trained machine learning model that given a source image, produces not only object categories for image subjects, but also places a bounding box around the image subjects. The visual intent detection model can be trained in one of two ways (also referred to as training modes). In the first mode, the visual intent detection model recognizes, categories, and places a bounding box around each subject in the image. This results in multiple (possibly overlapping) bounding boxes, each having associated categories from the taxonomy. Such an image can be presented to the user who can then select a particular subject of the image and then further user scenarios can be triggered based on the selected bounding box and associated category. These user scenarios can be the same as, or similar to, the user scenarios of the visual intent classifier. The user scenarios can also include scenarios different from the user scenarios of the visual intent classifier.

In a second mode, once the multiple subjects of the image have been recognized, classified and bounding boxes determined, the information is input into a trained suppression model. A search intent score for each of the different subjects can be separately calculated and the highest score, or highest several scores, can be used to trigger a user scenario.

Description

FIG. 1 is a representative diagram illustrating a representative architecture 100 according to some aspects of the present disclosure. This architecture 100 illustrates how a user device 102, such as a mobile phone, laptop, desktop, wearable, and so forth, can interact with a service that provides visual intent classification and/or visual intent detection. In this architecture 100, the specific service is a search service 108, although different services are illustrated in different embodiments described herein.

The user device 102 comprises a user interface 104 which can comprise any combination of a display, an input device, a camera, or other image capture system. The user device may also comprise an application 106 which is designed to submit a source image to the search service 108. The application 106 can be a browser, for example, or another type of application designed to interface with the appropriate service.

The search service 108 comprises an API layer 110 that provides access to services that provide visual intent classification 112 and/or visual intent detection 116. The API layer 110 can also provide access to the search engine 114 provided by the search service 108. The API layer can be any type of interface that can be used to access the services provided, such as a web API, remote procedure call, and so forth.

Visual intent classification 112 receives a source image (e.g., from the application 106) and produces one or more taxonomy categories/sub-categories (hereinafter classification labels) that describe the subject(s) of an image. For purposes of this disclosure a subject is something that is in an image such as a vehicle, natural object(s), and so forth. A subject does not have to be the focus of the image but rather can include anything in the image.

The visual intent classification 112 utilizes a machine learning model that is trained offline (e.g., offline process 120) to identify classification labels for subjects in a source image. The machine learning model can identify and assign classification labels for subjects in a source image and is very computationally efficient. The classification labels can be returned to the application 106, which can use the classification labels to make pre-triggering decisions as described in embodiments presented herein. Additionally, or alternatively, the service can use classification labels to make pre-triggering decisions. In a representative example, the classification labels of a source image can be used by the service 108 and/or the application 106 to help the user more clearly formulate a query that can be passed to the search engine 114. Other examples and embodiments are described below in greater detail.

The visual intent detection 116 utilizes a machine learning model that is trained offline (e.g., offline process 120) to identify both classification labels and to identify bounding boxes for the subjects in a source image. The image with bounding boxes and/or classification labels can be sent back to the application 106 for presentation to the user and for further processing. For example, the output of the visual intent detection 116 can be utilized to trigger further processing and/or scenarios like the visual intent classification and as discussed further below. As an example, the bounding boxes and/or the classification labels can allow a user to trigger a visual search on only a portion of an image.

Additionally, or alternatively, the visual intent detection can be coupled with additional logic to identify what the likely user intent is with regard to the source image. For example, what aspect of the source image is likely of most interest to the user and/or what sort of scenario is most likely going to be triggered by the user based on the output of the visual intent detection 116. As a representative example, suppression logic can be created that looks at all the bounding boxes and/or classification labels and determines which is most likely to be used by the user. The resultant subject can be identified and/or highlighted in the source image and the other bounding boxes and/or classification labels can be deemphasized and/or eliminated. Additionally, or alternatively, the most likely subject can be used (along with its bounding box and/or classification label(s)) to trigger further processing such as a visual search or other scenario, as explained in more detail herein.

In either case, the output of the visual intent detection 116 can be passed back to the user device (e.g., the application 106) and/or passed to the search engine 114 for visual and/or non-visual search of the data store 118.

The offline process 120 takes information 122 and trains the machine learning models as described herein. Additionally, the search engine 114 can rely on offline processing to index information 122 for quick retrieval and/or processing by the search engine.

Figure 2:
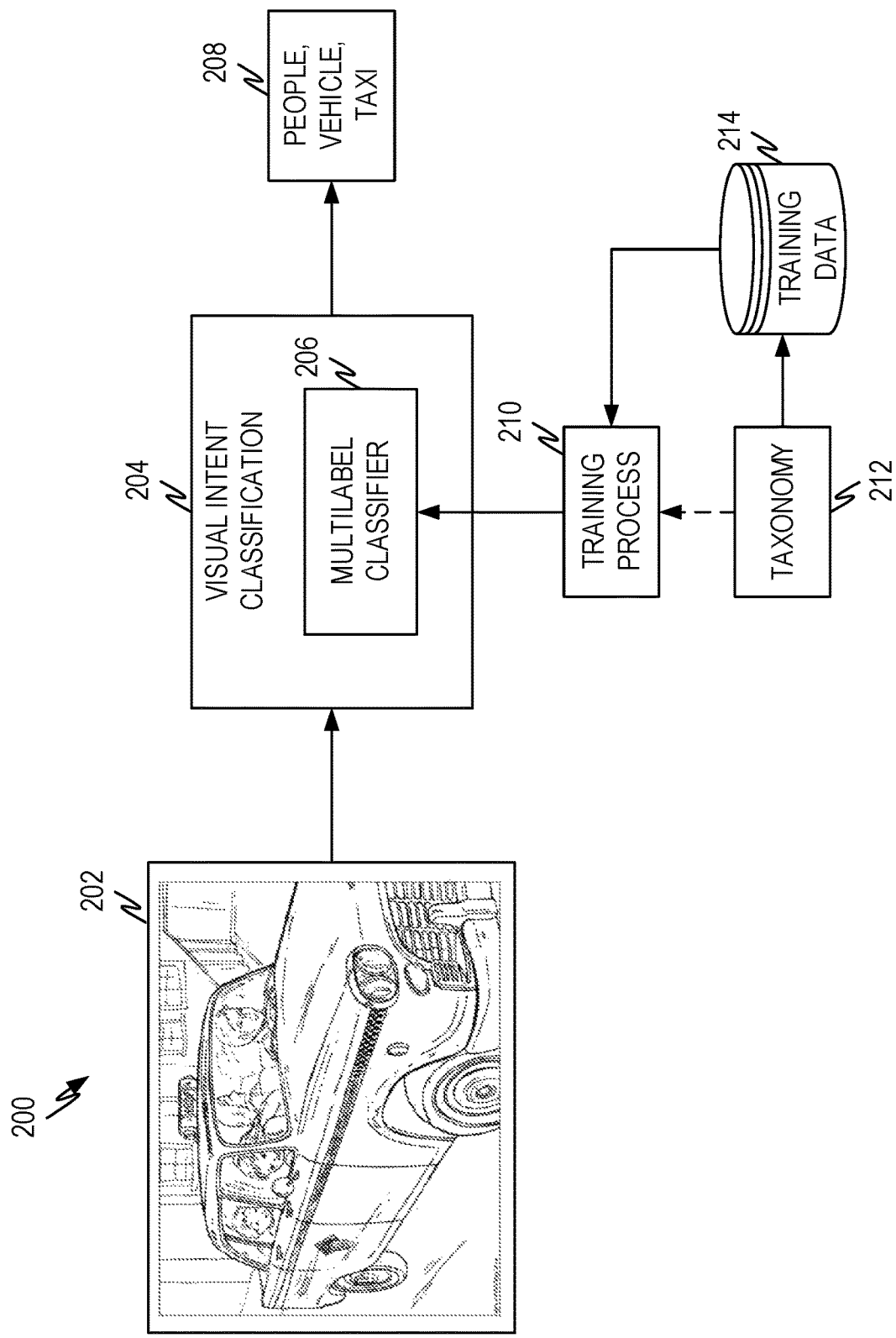
FIG. 2 is a representative diagram illustrating a representative architecture of visual intent classification according to some aspects of the present disclosure.

FIG. 2 is a representative diagram illustrating a representative architecture 200 of visual intent classification according to some aspects of the present disclosure. Visual intent classification 204 receives a source image 202 and utilizes a machine learning model, such as the multilabel classifier 206 to identify subjects in the source image 202. The output is a series of classification labels 208 that describe the subjects of the source image 202 according to a designated taxonomy 212. Table 1 below illustrates a representative taxonomy 212 for the multilabel classifier 206 in the visual intent classification engine 204.

TABLE 1

Taxonomy

| Taxonomy Category | Examples |
| --- | --- |
| animal | Dog, cat, bird, horse, and so forth |
| artwork2D | Paintings, watercolor, line drawing, cartoons, computer graphics, poster, album cover, video games, flyers, and so forth |
| artwork3D | Sculpture, including relief sculpture, and so forth |
| barcode | Barcode, QR code, and so forth |
| book | Book, including magazines, and so forth |
| cosmetics | Makeup and skin care items |
| electronics | Cell phone, tablet, laptop, desktop, monitor, smart watches, headphones, related accessories like cases, and so forth |
| face | Human face |
| people | Overall bounding box of a human, including all the clothes worn, but not including bags and other fashion objects and accessories |
| fashion | Clothing (shirts, pants, dresses, socks, and so forth), hats, gloves, jewelry, watches, necklace, bracelet, scarf, glasses, shoes, handbags, purses, belts, backpacks, costumes and so forth |
| food_or_drink | Fruits, vegetables, dishes of food, drink in cups, glasses, bottles, and so forth |
| gift | Any items wrapped or decorated as a gift, invitation cards, greeting cards, birthday cards, and so forth |
| home_or_office_ furnishing_or_decor | All objects related to home and/or office furnishing and/or decor, including appliances and tools used at the office or home such as TV, clock, refrigerator, and so forth, plants and pots as a whole. |
| logo | All brand or product logos |
| man_made_structure | Artificial structure, such as buildings, bridges, roads, tunnels, towers, halls, house, and so forth |
| map | All types of maps for cities, states, counties, countries, and so forth. |

TABLE 1-continued

Taxonomy

| Taxonomy Category | Examples |
| --- | --- |
| money | All types of money and currency |
| musical_instrument | Piano, saxophone, pipa, guitar, and so forth |
| nature_object | All natural objects such as sun, moon, stars, natural landmark, mountains, bodies of water, and so forth |
| newspaper | Newspapers |
| plant | All plants such as flowers, grass, plants excluding a pot, and other growing things. If a plant is ready to eat, it is labeled as food. If a plant is still growing or on the ground, it is labeled as a plant. |
| productivity | Business cards, whiteboard with notes, receipts, graphs, printed documents, and so forth. |
| school_or_office_ supply | Pencil cases, erasers, stapler, toner, copy paper, and other office or school supplies |
| sports_outdoor_ accessories | Sports and outdoor accessories such as balls (basketball, baseball, and so forth), rackets (tennis, squash, and so forth), helmets, and other outdoor accessories. Uniforms can be included in a fashion category. |
| tattoo | Tattoos on people |
| toy | Toys, games, stuffed animals, playing cards, and so forth |
| training_workout_item | Treadmill, dumbbell, training utility bench, and so forth |
| vehicle | Bicycle, motorcycle, car, ship, boat, airplane, baby strollers, car seat, and so forth |
| packaged_product | All packaged products available for purchase from a store, grocery and so forth, including packaged medicines. |
| other | Other items not falling into categories above. |

The taxonomy can be created so that items are only classified into one category. For example, uniforms, even though they are related to sports or professions, can be categorized in the fashion category and not the sports outdoor accessories category. Alternatively, items can be classified into multiple categories. Whether items are categorized into one or multiple categories will determine how training proceeds for the multilabel classifier 206.

The multilabel classifier 206 is trained in an offline process 210, which is discussed in greater detail below. However, in summary, the taxonomy is used as part of the training data 214 to create labeled subjects in images and the images are then used as part of the training process to create the trained multilabel classifier 206.

During training it is not guaranteed that there will be equal numbers of images for training in each of the categories of a taxonomy. As such, the imbalance of category instance in the web and/or camera image distribution can be corrected by accounting for the proportion of each category in the measurement set as weights of the Average Precision (AP). As such the average precision can be given by a novel weighted mean average precision (WmAP).

$$AP = \sum_{k=1}^{N} P(k)\delta r(k)$$

Where: k is the rank in the sequence of detected labels;
N is the number of detected objects;
P(k) is the precision at cut-off k in the list; and
δr(k) is the change in recall from k−1 to k.

The weighted mean average precision is then given by:

$$WmAP = \sum_{q=1}^{Q} \frac{N_q AP(q)}{\Sigma N_q Q}$$

Where: Q is the number of queries of each class;
$N_q$ is the number of instances of the category in the measurement.

Figure 3:
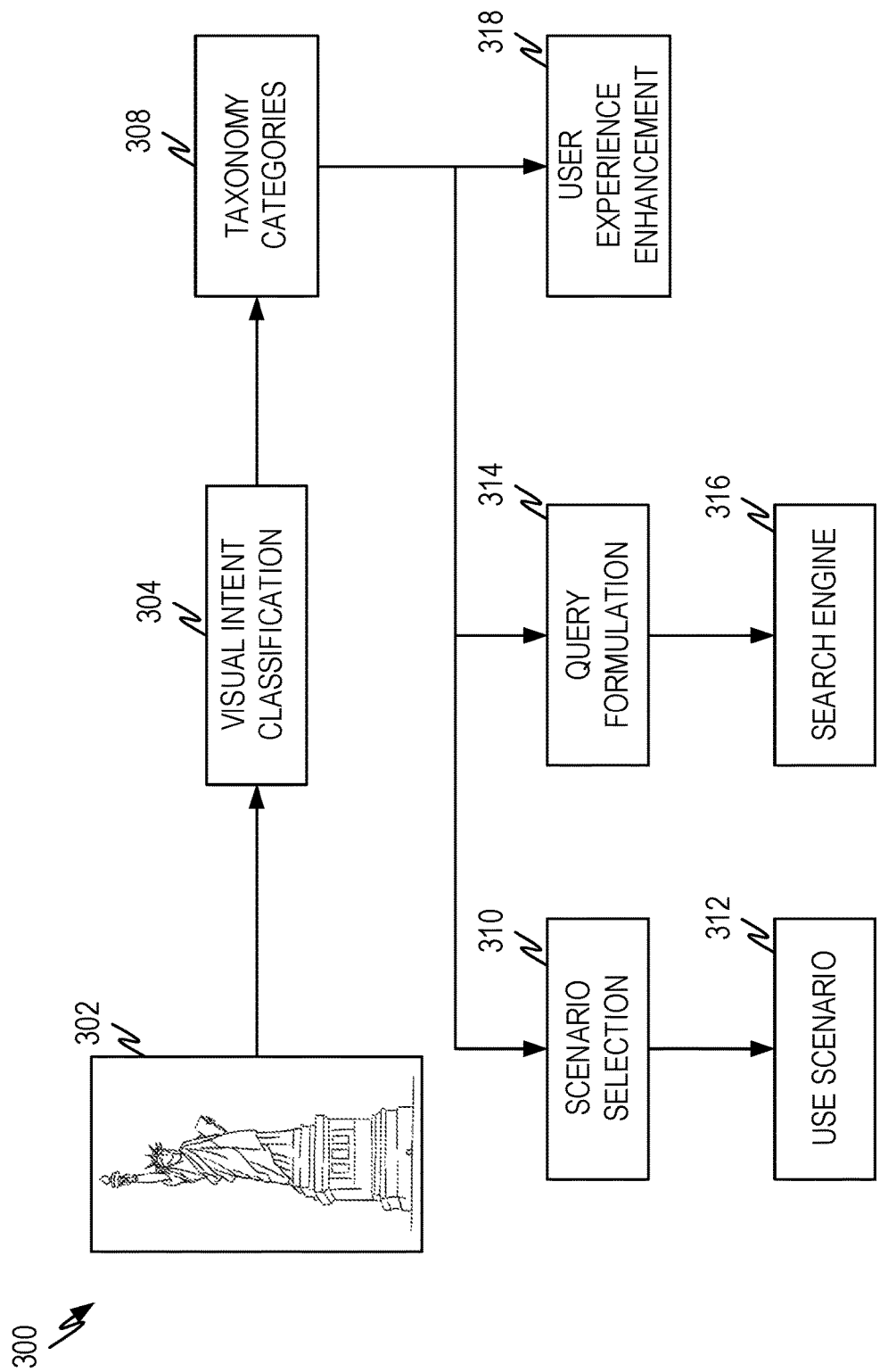
FIG. 3 is a representative diagram illustrating another representative architecture of visual intent classification according to some aspects of the present disclosure.

FIG. 3 is a representative diagram illustrating another representative architecture 300 of visual intent classification according to some aspects of the present disclosure. This diagram shows how the visual intent classification can be used as a pre-triggering process to trigger further scenarios and processes. By using the visual intent classifier as a pre-triggering process, significant reduction in computational costs can be realized. Furthermore, user experiences can be enhanced since the scenarios presented to the use will be relevant to the source image.

As discussed above, a source image 302 is presented to the visual intent classification process 304 and the visual intent classification process 304 produces one or more classification labels 308 using a trained multilabel classifier. The classification label(s) 308 which are associated with a source image 302 can help the system identify what the user is likely to do and/or the further processing that is relevant to the source image. As an example, if the subject of the source image is a packaged product, the user may want to know thing such as where can I purchase the packaged product. However, if the subject of the source image is a famous building, landmark, natural object, and so forth, the user is unlikely to want to know where the user can purchase the object.

Thus, the classification labels 308 can be used by a scenario selection process 310 to select a particular use scenario 312 and engage further processing based on the use scenario. Examples of this are described in greater detail below. Similarly, the classification labels 308 can be used to help the user to formulate a query 314, either a visual query or a non-visual query or both, and the query can be submitted to a search engine 316. Additionally, or alternatively, the user experience can simply be enhanced 318 by having the system present more intelligent options and/or anticipate what the user is likely to want based on the classification labels 308 and other information (not shown).

Figure 4:
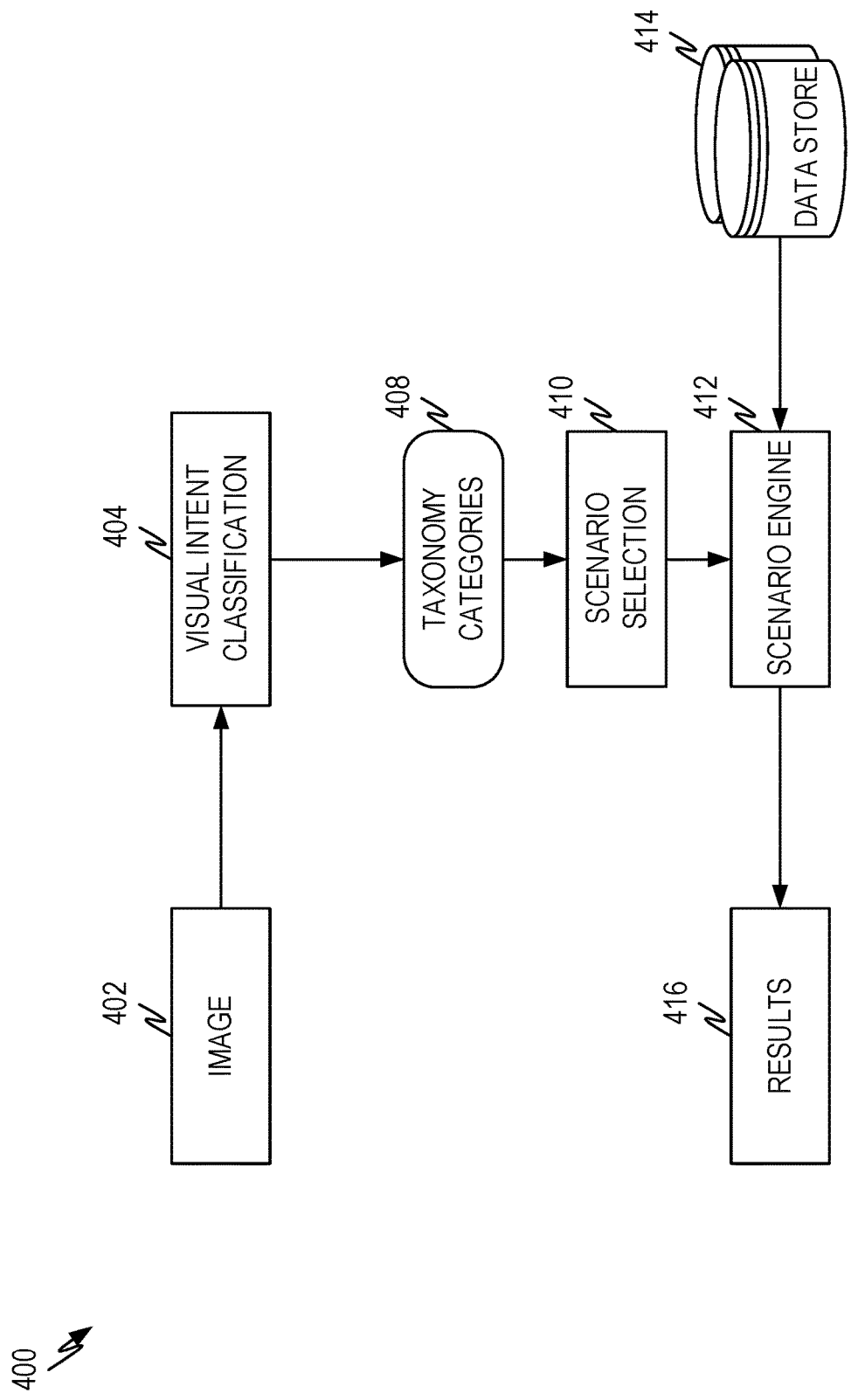
FIG. 4 is a representative diagram illustrating another representative architecture of visual intent classification according to some aspects of the present disclosure.

FIG. 4 is a representative diagram illustrating another representative architecture 400 of visual intent classification according to some aspects of the present disclosure. This diagram shows in greater detail how classification labels can be used to trigger particular user scenarios. The source image 402 is presented to a visual intent classification process 404 having a trained multilabel classifier 406. The multilabel classifier produces classification labels 408 that describe the subjects of the source image 402.

A scenario selection process 410 utilizes the classification labels 408 and, in some embodiments, other information to identify and select a particular use scenario that should be triggered based on the information. The scenario selection process 410 can be implemented using a variety of approaches. For example, the scenario selection process 410 can utilize a set of rules that identify the classification labels 408 and select one or more scenarios based on the combination of classification labels and/or other information. As another example, the scenario selection process 410 can utilize one or more trained machine learning models to invoke scenarios based on the input classification labels 408 and/or other information. As a particular implementation example, personal digital assistants are designed to ascertain what a user desires and then invoke processing to accomplish the task(s) the user is likely to want accomplished. Thus, the classification labels and/or other user information can be presented to either a digital assistant or to a similar entity to identify what the likely use scenario is given the classification labels 408 and/or other information.

Use scenarios selected by the scenario selection process 410 can include, but are not limited to, fashion scenario (discussed in FIG. 5), visual search operations, visual question answering, visual object recognition, shopping or purchase scenarios that indicate where the same or a similar product can be purchased either locally or online, informational services where the system indicates additional information about a subject in the image, search services where the system executes queries related to the subject of the service, identification services where identification of the subject of an image is provided such as identifying a particular individual in an image, automatic tagging or captioning of an image, performing tasks on behalf of a user such as booking a flight, and/or other such services.

In another representative example, a user presents a source image 402 showing a resort at a vacation destination. The classification labels 408 for such a source image 402 can include nature object, man made structure, sports outdoor accessories, people, and/or fashion. If the system additionally knows that a user has an upcoming trip scheduled to the vacation destination or time blocked out on her calendar for a vacation, the scenario selection process 410 could reasonable conclude that the user may be interested in having help planning the vacation, finding out more information about the resort, or other related activities. Thus, the scenario selection process 410 can offer to invoke particular processing to help with one or more of these tasks.

In this last example, the scenario selection process 410 can produce a set of candidate use scenarios and select the top few to present to the user as options and allow the user to select which of the user scenarios the user would like to engage. Thus, user input can be part of the scenario selection process 410. Also, other information such as user context (any information about the user or user device being used to submit the source image 402), user calendar information, and other user or non-user data can be combined with the classification labels 408 to produce a selected scenario. User permission and other privacy principles are observed by the system as it engages with the user and selects candidate scenario(s).

Once the scenario selection process 410 identifies a use scenario to engage, the scenario selection process 410 can pass the appropriate information to a selected scenario engine 412 and allow the scenario engine 412 to engage processing on the information. For example, the scenario engine 412 may be a visual search against images of a selected classification label 408. Thus, the data store 414 can be limited to relevant images and the results 416 can be returned to the user and/or user device.

Coupling the visual intent classifier to produce classification labels for a source image brings two benefits. The first is that the classification labels can simplify scenario processing and dramatically save computing resources. Second is that the use scenarios can be limited to those that make sense (are relevant) to the source image.

Figure 5:
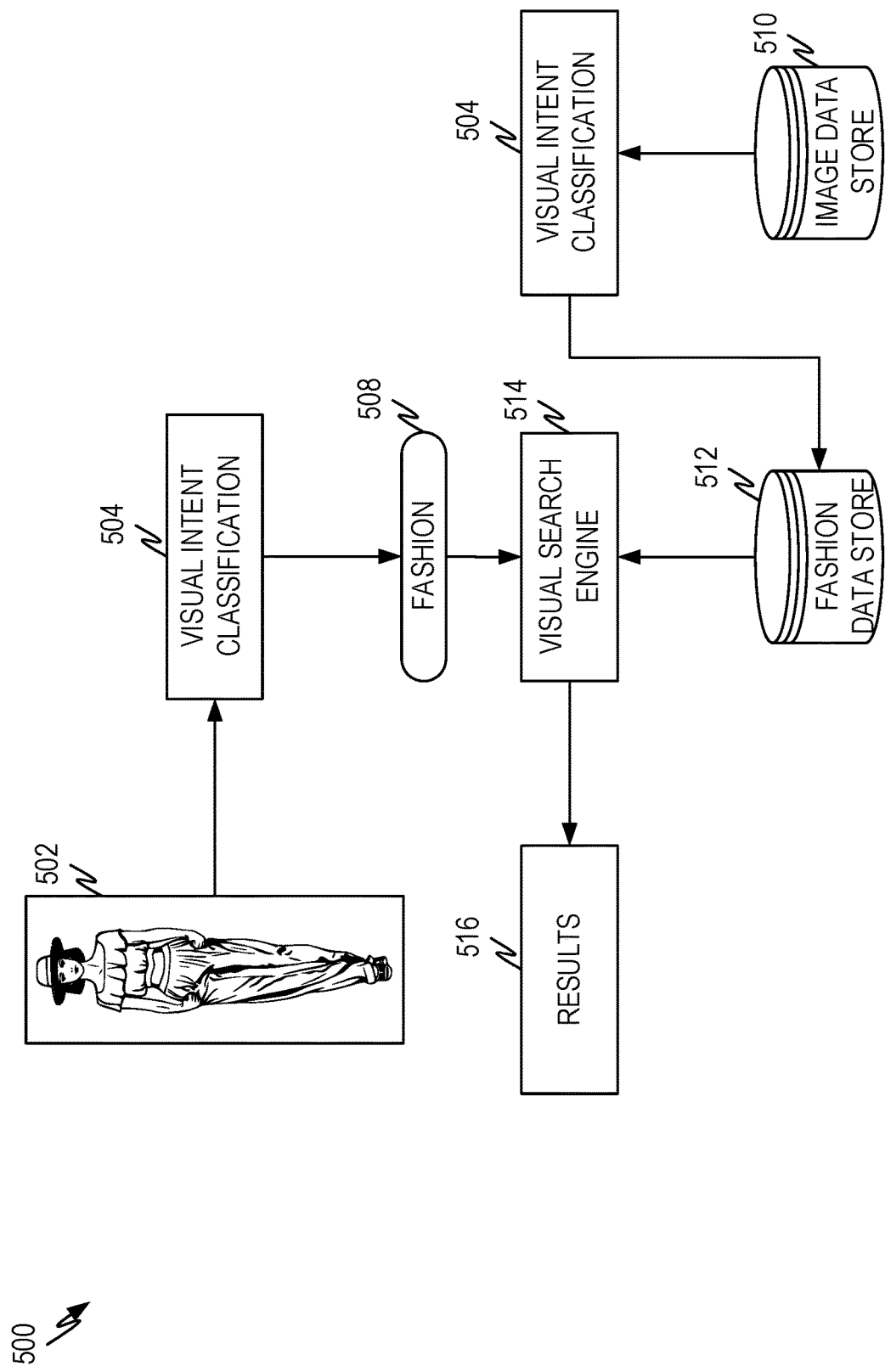
FIG. 5 is a representative diagram illustrating another representative architecture of visual intent classification according to some aspects of the present disclosure.

FIG. 5 is a representative diagram illustrating another representative architecture 500 of visual intent classification according to some aspects of the present disclosure. This diagram illustrates an instance of how the general architecture of FIG. 4 works in the context of a fashion engine.

The visual intent classification process 504 receives a source image 502. Using the trained multilabel classifier the visual intent classification process 504 identifies classification labels 508 that describe the subjects of the source image 502. In this instance the source image 502 illustrates a person along with the clothes and other accessories (hat, shoes, etc.) that she is wearing. In this case, the classification labels 508 includes "fashion" from the representative taxonomy illustrated in Table 1 above.

In this representative example, the use scenario for the "fashion" classification process is to engage fashion/search engine to do a visual search on the source image. Thus, the use scenario is to do a visual search on the images in the image data store 510. Rather than compare the feature vector(s) of the source image 502 to the images in the image data store 510, the system proceeds in a different way.

Offline, or as part of the source image processing, the visual intent classification process 504 can use the trained multilabel classifier to identify classification labels that are associated with images in an image data store 510. The images in the image data store 510 can comprise images from the web as well as images captured from image capture devices such as cameras, mobile phones, and so forth.

Because the images in the image data store 510 have associated classification labels generated by the same trained multilabel classifier, the classification labels can be used as a pre-screening of the images in the data store 510. Thus, those images with the same classification labels as the labels from the source image can be considered for matching. In the representative example of a fashion visual search, images from the image data store 510 with a classification label of "fashion" can be considered for visual search. This subset is illustrated by the fashion data store 512, which includes images with the fashion classification label.

The visual search engine 514 can then use the source image 502 to perform a visual search on the images in fashion data store 512 and the results 516 returned to the user and/or user device.

In a representative implementation where the architecture of FIG. 5 was compared against a visual search performed across the image data store 510, the architecture of FIG. 5 had a 87% Graphics Processing Unit computational saving over the more traditional approach of visual search. Thus, the speed and efficiency of visual search can be improved dramatically by using the visual intent classification as a pre-trigger to visual search results in significant computational savings.

Figure 6:
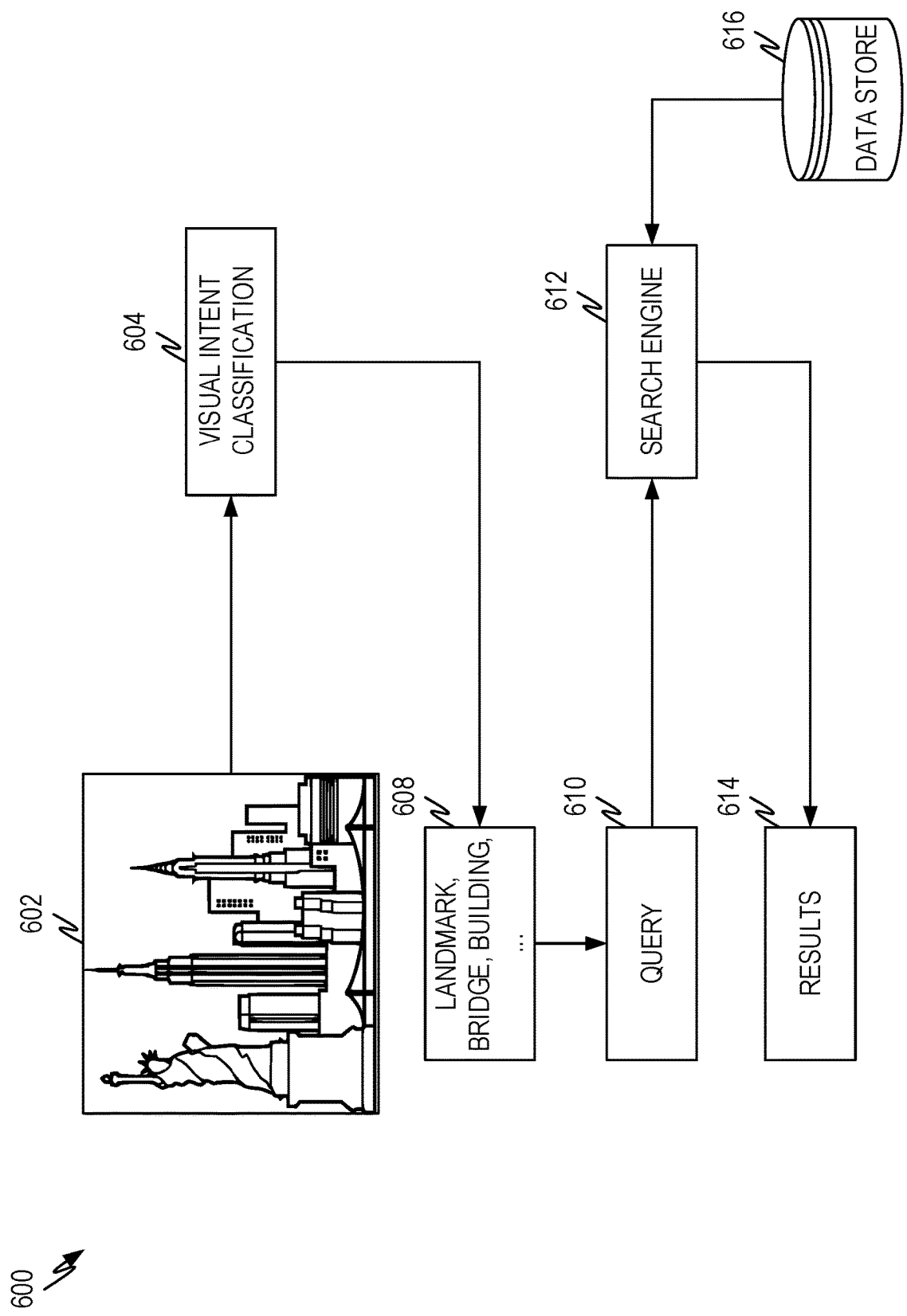
FIG. 6 is a representative diagram illustrating another representative architecture of visual intent classification according to some aspects of the present disclosure.

FIG. 6 is a representative diagram illustrating another representative architecture 600 of visual intent classification according to some aspects of the present disclosure. In this embodiment, the visual intent classification is used to help the user formulate a query related to the source image.

The source image 602 is presented to the visual intent classification process 604 and the process uses the trained multilabel classifier to identify classification labels 608 associated with the source image 602.

The classification labels 608 can be used by either the service or by a user application (e.g., application 106) to help the user formulate a query that is more targeted to what the user wants. For example, in the source image 602, various man-made buildings and landmarks are illustrated. When a source image 602 has multiple subjects, with their associated classification label(s), it can be difficult to identify what aspect of the source image the user is actually interested in.

Thus, the user can be presented with the classification label(s) 608 of the source image 602 and the user can indicate which aspect(s) the user is interested in. The selected classification label(s) along with the source image 602 can then be used to formulate a query for visual or non-visual search that can then be submitted to a search engine 612. The search engine then executes the query against one or more appropriate data store(s) 616 and returns the results 614 for presentation to the user.

Figure 7:
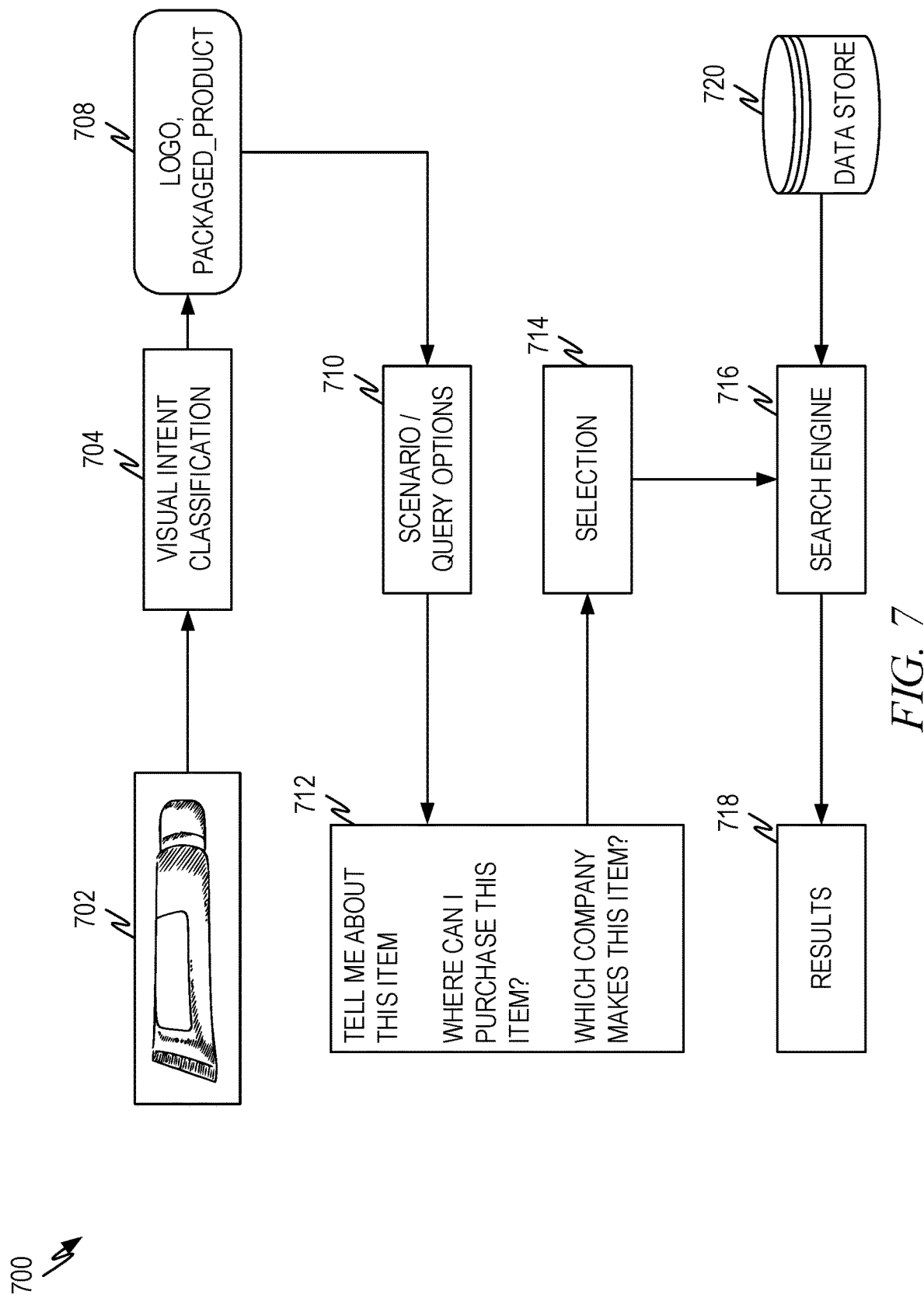
FIG. 7 is a representative diagram illustrating another representative architecture of visual intent classification according to some aspects of the present disclosure.

FIG. 7 is a representative diagram illustrating another representative architecture 700 of visual intent classification according to some aspects of the present disclosure. This diagram represents an example of how the system of FIG. 6 can be used in the example of a packaged product.

A source image 702 comprising an item is presented to the visual intent classification process 704. The trained multilabel classifier identifies classification label(s) associated with the item. As a representative example, the classification label(s) may include packaged product and/or logo from the taxonomy of Table 1 above. In an alternative taxonomy, the classification label(s) may be different.

The use scenario/query options process 710 utilizes the classification label(s) to identify potential queries that are relevant to the source image. For example, in the context of the classification labels for an item, queries may include the following among others:

Tell me about this item.
Where can I purchase this item?
Which company makes this item?
Find me similar items.
What is the cost of this item?
Find more photos of this.

If the source image 702 related to a famous landmark rather than an item, queries could include the following among others:

What am I looking at?
Where is this landmark located?
When was this built?
Can I visit this place?
Find more photos of this.

The system can use a ranking process similar to (or the same as) the ranking processes used by a search engine to produce the most relevant set of queries for the user and the product categories. In other words, the classification label(s) become a source of data for the system to use to help generate queries relevant to the source image. For example, any combination of user preferences, user context data, image metadata, classification labels, and/or other information can be used to identify candidate queries that similar users have submitted about similar images using known processes in search engines. These candidate queries can then be ranked in order to select the top several queries to present to the user as an option. The number of queries that are selected can depend upon the device that will be used to present the queries to the user. For example, a device with a large screen may result in more queries selected as compared to a device with a small screen.

The user can select one of the queries, modify the presented queries, or enter a query not presented as illustrated in selection operation 714. The selected query is then passed to the search engine 716 for execution against one or more appropriate data stores 720 and the results 718 returned so they can be presented to the user.

As noted in this example, a source image can be used to generate queries about one or more subjects in the source image. These queries may be queries related to a visual search or a non-visual search. As illustrated above, because the multilabel classifier is efficient in terms of computational cost, the use experience can not only be improved (e.g., by identifying use scenarios relevant to the source image and/or to the user) but the computational costs overall can be significantly less.

Figure 8:
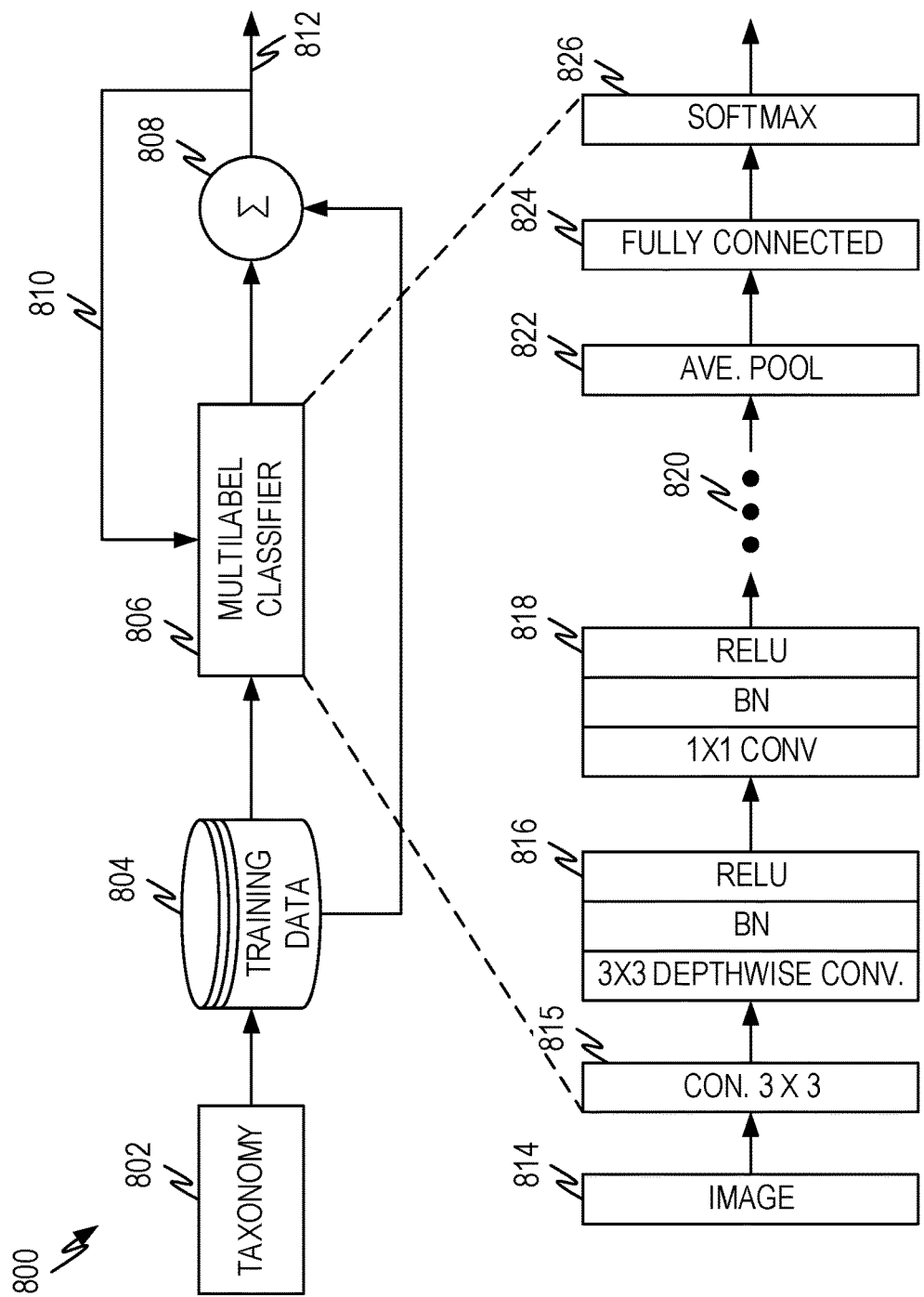
FIG. 8 is a representative diagram illustrating training of a representative visual intent classification model according to some aspects of the present disclosure.

FIG. 8 is a representative diagram illustrating training 800 of a representative visual intent classification model according to some aspects of the present disclosure. As noted herein, the visual intent classification model is formulated as a multilabel classification problem. In other words, the task is to identify classification labels for subjects that exist in a source image. In one embodiment, the multilabel classifier 806 is a MobileNet classifier trained according to a unique training methodology described herein.

The MobileNet classifier is a computationally efficient classifier with performance that is quite good. The MobileNet classifier was first described in *MobileNets: Efficient Convolutional Neural Networks for Mobile Vision Applications* by Andrew G. Howard, Menglong Zhu, Bo Chen, Dmitry Kalenichenko, Weijun Wang, Tobias Weyand, Marco Andretto and Hartwig Adam (available from: arXiv: 1704.04861v1 [cs.CV] 17 Apr. 2017) and which is incorporated herein by reference. MobileNet make use of depthwise separable convolutions to build a light-weight deep neural network. The first layer is a "regular" convolutional layer followed by alternating depthwise (dw) and pointwise convolutional layers. In some embodiments, the first convolutional layer has a stride of 2 (S2) rather than stride of 1 (S1). Table 2 below lists the structure of a representative MobileNet implementation.

TABLE 2

Example MobileNet Architecture

| Layer Type/ stride | Filter Shape | Example Input Size |
|---|---|---|
| Convolutional/S2 | 3 × 3 × 3 × 32 | 224 × 224 × 3 |
| Convolutional dw/S1 | 3 × 3 × 32 dw | 112 × 112 × 32 |
| Convolutional/S1 | 1 × 1 × 32 × 64 | 112 × 112 × 32 |
| Convolutional dw/S2 | 3 × 3 × 64 dw | 112 × 112 × 64 |
| Convolutional/S1 | 1 × 1 × 64 × 128 | 56 × 56 × 64 |
| Convolutional dw/S1 | 3 × 3 × 128 dw | 56 × 56 × 128 |
| Convolutional/S1 | 1 × 1 × 128 × 128 | 56 × 56 × 128 |
| Convolutional dw/S2 | 3 × 3 × 128 dw | 56 × 56 × 128 |
| Convolutional/S1 | 1 × 1 × 128 × 256 | 28 × 28 × 128 |
| Convolutional dw/S1 | 3 × 3 × 256 dw | 28 × 28 × 256 |
| Convolutional/S1 | 1 × 1 × 256 × 256 | 28 × 28 × 256 |
| Convolutional dw/S2 | 3 × 3 × 256 dw | 28 × 28 × 256 |
| Convolutional/S1 | 1 × 1 × 256 × 512 | 14 × 14 × 256 |
| 5× Convolutional dw/ S1Convolutional/S1 | 3 × 3 × 512 dw 1 × 1 × 512 × 512 | 14 × 14 × 512 14 × 14 × 512 |
| Convolutional dw/S2 | 3 × 3 × 512 dw | 14 × 14 × 512 |
| Convolutional/S1 | 1 × 1 × 512 × 1024 | 7 × 7 × 512 |
| Convolutional dw/S2 | 3 × 3 × 1024 dw | 7 × 7 × 1024 |
| Convolutional/S1 | 1 × 1 × 1024 × 1024 | 7 × 7 × 1024 |
| Average Pooling/S1 | Pool 7 × 7 | 1 × 1 × 1024 |
| Fully connected/S1 | 1024 × N† | 1 × 1 × 1024 |
| Softmax/S1 | Classifier | 1 × 1 × N |

†Where N is the number of categories in the taxonomy

The structure of the example MobileNet architecture is illustrated in FIG. 8 with the source image 814 input into the classifier which includes a convolutional layer 815, a 3×3×3 depthwise convolutional layer 816, a 1×1 convolutional layer 818 and ellipses 820 to represent the other layers of the model, such as the implementation of Table 2. Each layer is typically followed by a batch normalization (BN) layer and a rectified linear unit (ReLU) activation layer. These are illustrated in the Figure but are not included in Table 2. However, those of skill in the art would understand to add these layers.

The final layers in the classifier are an average pooling layer 822, a fully connected layer 824 and a softmax (or other classifier) layer 826.

To train the classifier, the taxonomy is used to label image training data 804. In one embodiment both images from the web and images from an image capture device are used in the training data. The training data is used to train the model 806 by inputting a selected training image into the model and evaluating the output of the model to ascertain whether the model identified the proper classification labels as indicated by 808. Feedback 810 in the form of an error function adjusts the weights in the classifier until the model converges 812.

A standard MobileNet architecture is a single subject classifier. The multilabel version used in embodiments of the disclosure utilizes two multilabel classification losses. The first is a multilabel elementwise sigmoid loss and the second is a multilabel softmax loss. These are used as objective functions to train the classifier to predict multiple classification labels for a source image. The cross-entropy (logistic) loss is formally written as:

$$E = -\frac{1}{N}\sum_{n=1}^{N} [p_n \log \hat{p}_n + (1 - p_n) \log(1 - \hat{p}_n)]$$

Where: N is the number of samples in the mini-batch;
$\hat{p}_n$ is the predicted probability of the sample n; and
$p_n$ is the groundtruth label.

This allows the MobileNet classifier to handle prediction of multiple subjects at the same time.

Figure 9:
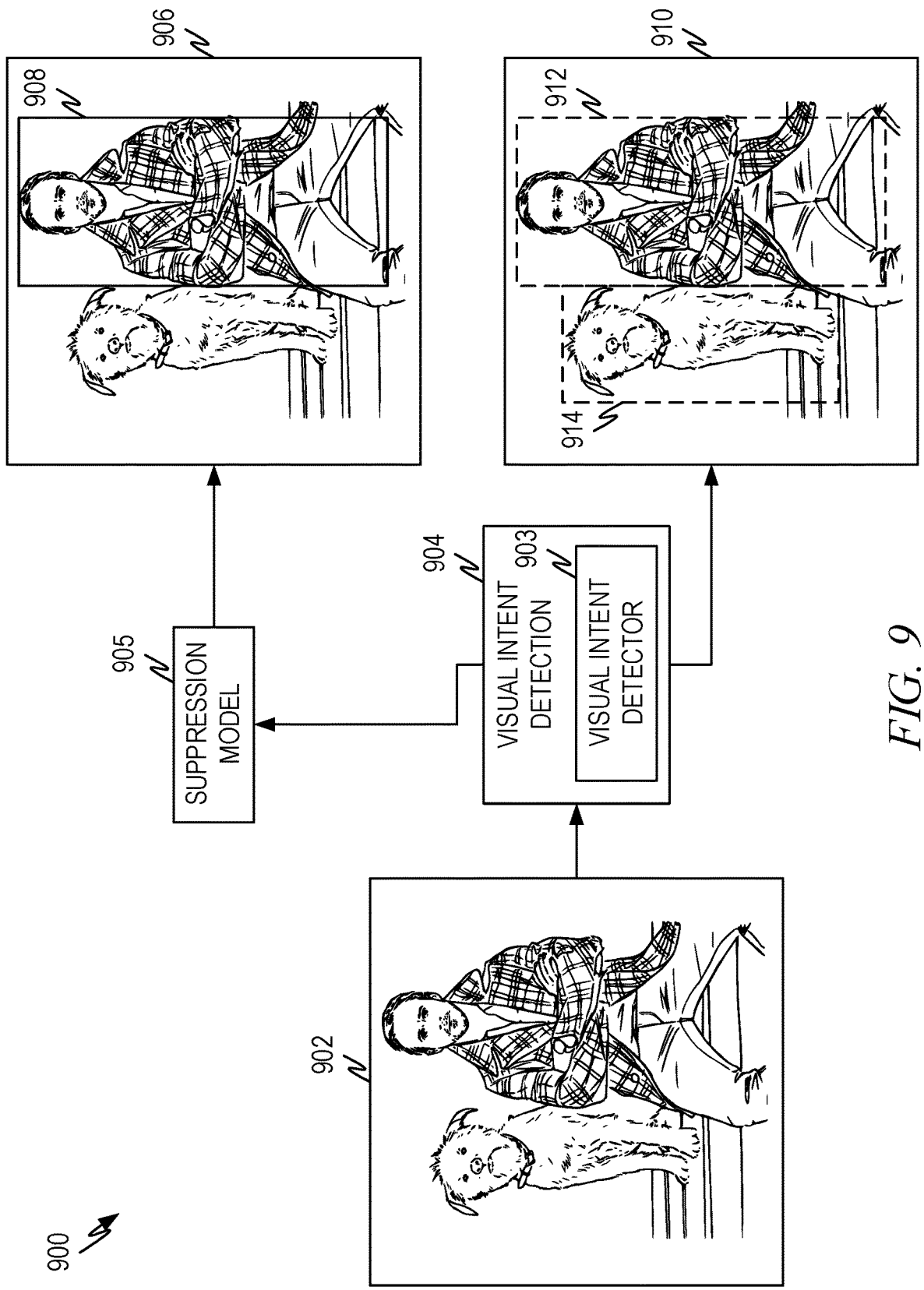
FIG. 9 is a representative diagram illustrating a representative architecture of visual intent detection according to some aspects of the present disclosure.

FIG. 9 is a representative diagram illustrating a representative architecture 900 of visual intent detection according to some aspects of the present disclosure. The goal of the visual intent detection is to predict both the subject categories and the precise bounding box location of subjects of visual intent. Visual intent are those subjects within the image that are most likely to be of interest to the user or are most likely to be used in further processing as explained herein. The visual intent detection process 904 comprises a machine learning model as described below.

The visual intent detection process along with its machine learning model can operate in one of two ways. Given a source image 902 which has multiple subjects, such as the dog and person illustrated in FIG. 9, the visual intent detection process 904 identifies both the classification labels (e.g., person, animal) complying with a selected taxonomy, and also identifies a bounding box for each of the subjects using a trained visual intent detector 903. In this case the output image 910 shows bounding boxes 912, 914 around the subjects of the source image. Although not shown, the bounding boxes 912, 914 can also be labeled with their respective classification labels. This mode of operation is useful where multiple search intents are indicated based on scores or when the visual intent detection process is coupled with additional processing as discussed herein.

In another mode of operation, the visual intent detection process 904 can be coupled with a suppression model 905 that identifies the most likely subject in the source image. As described herein, the suppression model 905 can use a score for each of the individual subjects and select the top or top few scores and suppress others. For example, the suppression model 905 can suppress items with scores below a threshold. As another example, the suppression model 905 can select the subjects with the top K scores and suppress others. Other suppression strategies can also be used.

The result is the output image 906 comprises a single bounding box 908 along with related classification label(s). When multiple subjects are not suppressed, the output image would have multiple bounding boxes and related classification labels for the non-suppressed subjects.

Figure 10:
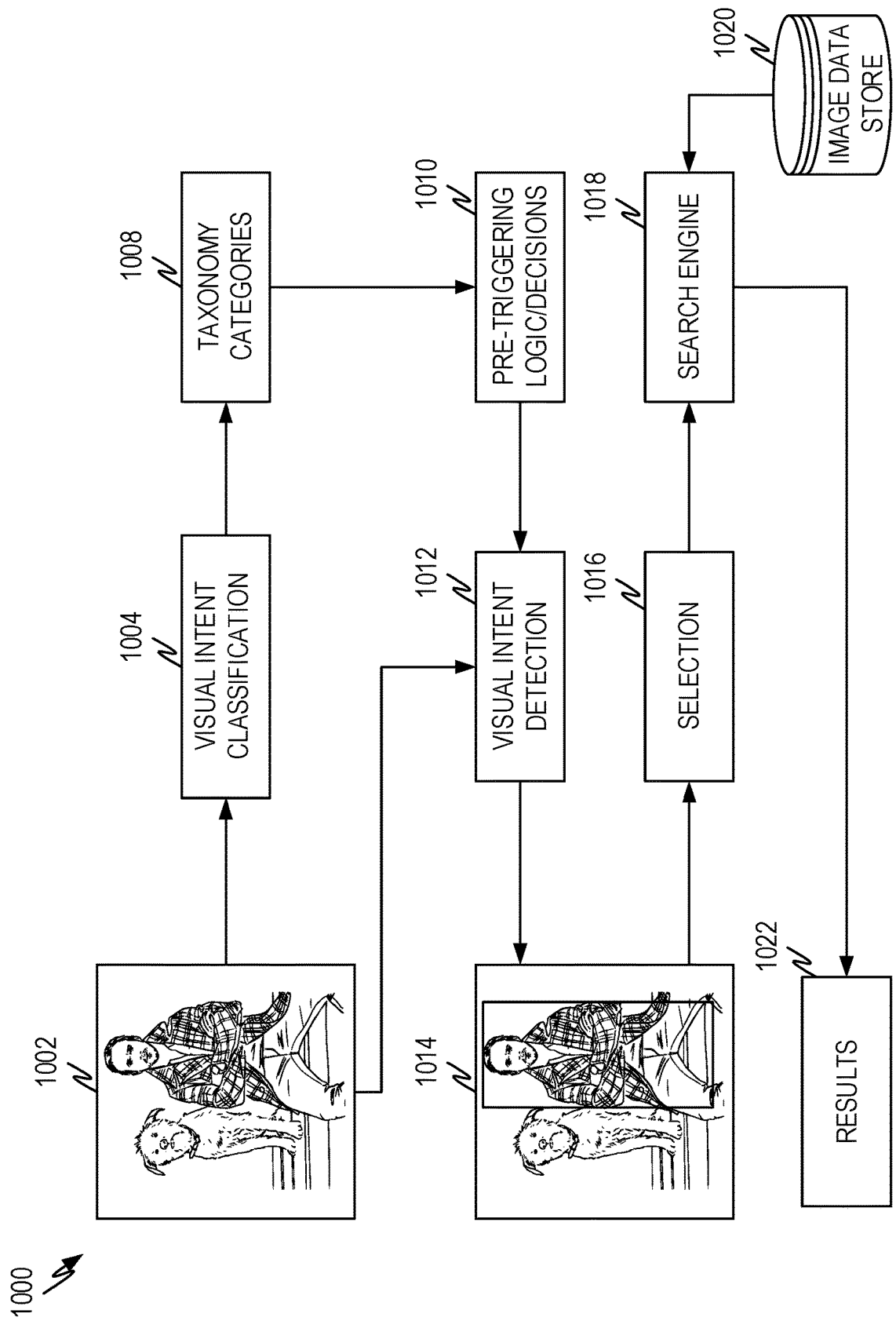
FIG. 10 is a representative diagram illustrating a representative architecture showing visual intent classification and visual intent detection working together according to some aspects of the present disclosure.

The visual intent classification processes and visual intent detection can be combined in some embodiments. FIG. 10 is a representative diagram illustrating a representative architecture 100 showing visual intent classification and visual intent detection working together according to some aspects of the present disclosure. In this embodiment, a source image 1002 is received by the visual intent classification process 1004, which uses its trained multilabel classifier to identify classification labels 1008 associated with subjects of the source image 1002.

As described in conjunction with other embodiments of the present disclosure, the classification labels 1008 along with other information (in some embodiments) can be used by scenario selection, pre-triggering logic, and so forth, represented in FIG. 10 by the pre-triggering logic/decisions 1010 to identify further processing that should be performed. One option is that the pre-triggering logic/decisions 1010 can determine to invoke the visual intent detection process 1012. Such may be possible, for example, when the classification labels 1008 are not sufficient to allow the system to help the user formulate a query and it would be helpful to show the user the bounding boxes associated with the subjects in the source image 1002.

The visual intent detection process 1012 can then operate in one of the two modes previously described to produce a resultant image 1014 with the relevant subject(s) identified by bounding boxes and classification labels. The user can then make a selection 1016 which can be passed to the search engine 1018 to execute the associated query across the appropriate data store(s) 1020. Results can then be returned and displayed to the user 1022.

Figure 11:
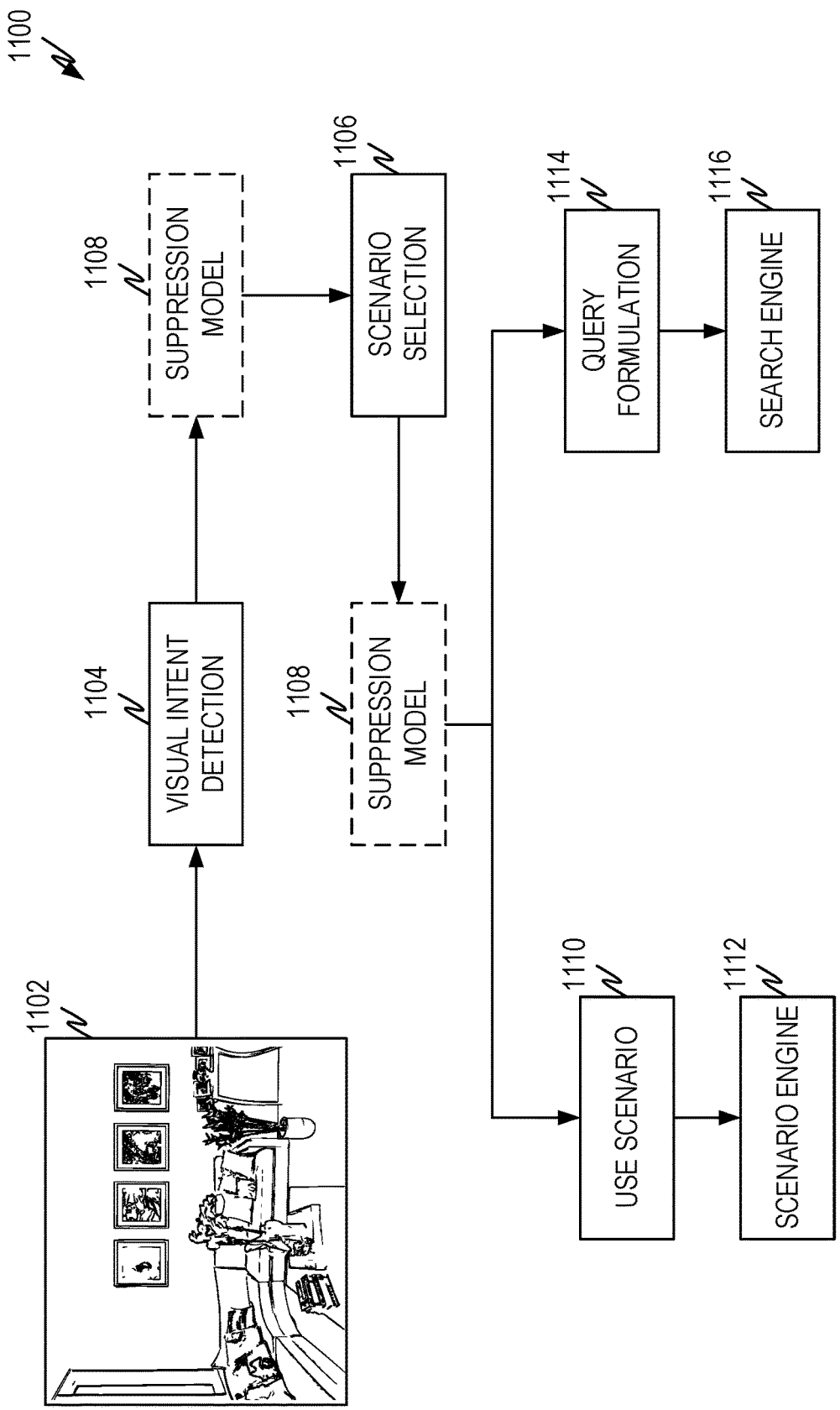
FIG. 11 is a representative diagram illustrating another representative architecture of visual intent detection according to some aspects of the present disclosure.

FIG. 11 is a representative diagram illustrating another representative architecture 1100 of visual intent detection according to some aspects of the present disclosure. Like the visual intent classification process described herein, the visual intent detection process can be used to trigger further processing based on the output of the visual intent detection process.

A source image 1102 can be presented to the visual intent detection process 1104 which identifies the subjects, the bounding boxes for the subjects and the classification labels for the subjects using the trained visual intent detector. These can be placed through a suppression model 1108 if desired and sent to use scenario selection process 1106.

As previously described, the use scenario selection process 1106 can utilize the information from the visual intent detection process 1104 (with or without suppression) and/or other information to make a selection one or more use scenarios that should be invoked. The use scenario selection process 1106 can utilize a set of rules, a trained machine learning model, or any combination thereof to make decisions of one or more scenarios that should be invoked based on the input information (output of the visual intent detection process 1104 and/or other information as described). Thus, the scenario selection process 1106 can operate as other scenario selection process previously described.

As examples of scenarios that can be triggered by the scenario selection process 1106, FIG. 11 illustrates a use scenario 1110 and/or a query formulation 1114. A use scenario can be as previously described where when the classification label indicates a taxonomy category, such as fashion, a fashion visual search engine can be engaged, such as described in conjunction with FIG. 5. In this situation, however, the system knows not only the category (e.g., fashion) but also the bounding box in the image where the subject can be found in the image.

To expand on how the addition of a bounding box can be utilized, consider the source image 502 in FIG. 5. The image is of a person wearing a hat, clothing of a particular style and shoes of a particular style. These are the subjects of the source image 502 in this example. When input into the visual intent detector 1104, the output would be not only classification labels for each of the subjects (hat, person, clothing, shoes), but also bounding boxes where each subject can be found in the image.

The scenario selection logic may select a fashion engine use scenario based on the classification labels, the bounding boxes, and/or other information as previously described. If the system predicts that a user is likely to be more interested in the hat than the other aspects, the image can be cropped and the hat fed to a fashion visual search engine.

Additionally, or alternatively, if the suppression model 1108 identify one particular subject of the image as the subject of interest in the source image, the image can be cropped to the appropriate bounding box prior to engaging the scenario engine. Other use scenarios can also take the entire source image or a cropped version based on bounding boxes.

As an alternative to suppression model 1108 being applied prior to scenario selection process 1106, the suppression model 1108 may be applied after scenario selection process 1106.

As noted above, a use scenario 1110 if selected by the scenario selection process 1106 can engage a scenario engine 1112 to further process the source image or to provide additional services based on the source image. The example of a fashion engine has already be discussed. Use scenarios selected by the scenario selection process 410 can include, but are not limited to, fashion scenario (discussed above and in FIG. 5), visual search operations, visual question answering, visual object recognition, shopping or purchase scenarios that indicate where the same or a similar product can be purchased either locally or online, informational services where the system indicates additional information about a subject in the image, search services where the system executes queries related to the subject of the service, identification services where identification of the subject of an image is provided such as identifying a particular individual in an image, automatic tagging or captioning of an image, performing tasks on behalf of a user such as booking a flight, and/or other such services. Each of these scenarios can have one or more scenario engines 1112 that perform the actual tasks such as search service(s) visual and non-visual, a digital assistant, a specialized engine such as the fashion engine, and so forth.

Another aspect the scenario selection process 1106 can engage is a process to help the user better formulate a query 1114. Query formulation process 1114 can engage the user such as by presenting options and asking the user to select or provide a query such as was previously illustrated in conjunction with FIG. 7. The bounding box also provides a selection target for the user to indicate what aspect of the source image they are interested in (assuming that the suppression model 1108 is not used or returns multiple answers). Thus, the image with bounding boxes around subjects can be presented to a user and once the user selects one of a plurality of bounding boxes, the system can then present suggested queries that relate to the selected subject. The resultant query can be submitted to a visual and/or non-visual search engine 1116 as appropriate.

Figure 12:
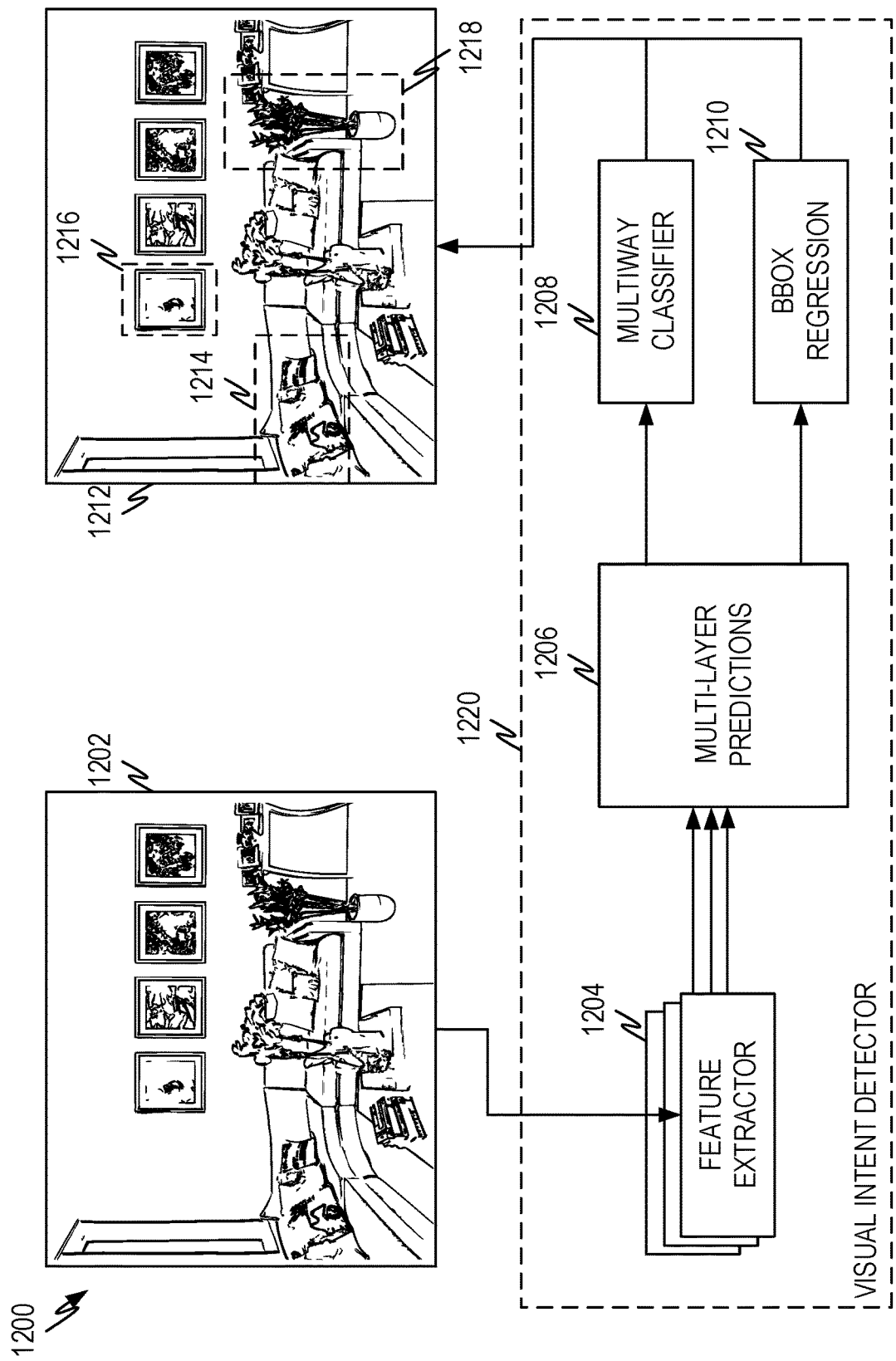
FIG. 12 is a representative diagram illustrating another representative architecture of visual intent detection according to some aspects of the present disclosure.

FIG. 12 is a representative diagram illustrating another representative architecture 1200 of visual intent detection according to some aspects of the present disclosure. This architecture 1200 is designed to present at a high level the functions provided by a representative visual intent detector 1220. Details of an appropriate detector are discussed below.

A source image 1202 is presented to the visual intent detector 1220 and the resultant image 1212 comprises bounding boxes 1214, 1216, 1218 that identify subjects in the source image 1202 along with classification labels, which in some embodiments are placed proximate to the bounding boxes 1214, 1216, 1218.

The visual intent detector 1220 comprises a plurality of feature extractors 1204 that extract features from the source image 1202. The extracted features are presented to a plurality of multi-layer predictors 1206 which make predictions about the various features and which are important to recognition of the subjects in the source image 1202. The resultant predictions are used to both classify the subjects using a multi-way classifier 1208 and identify a bounding box for the subject using a bounding box regression analysis 1210.

The presented architecture illustrates the functional operations that are performed on the source image 1202 to produce the resultant image 1212 with the bounding box and classification labels. In practice, the separate functional units may be implemented in a combined machine learning model.

Figure 13:
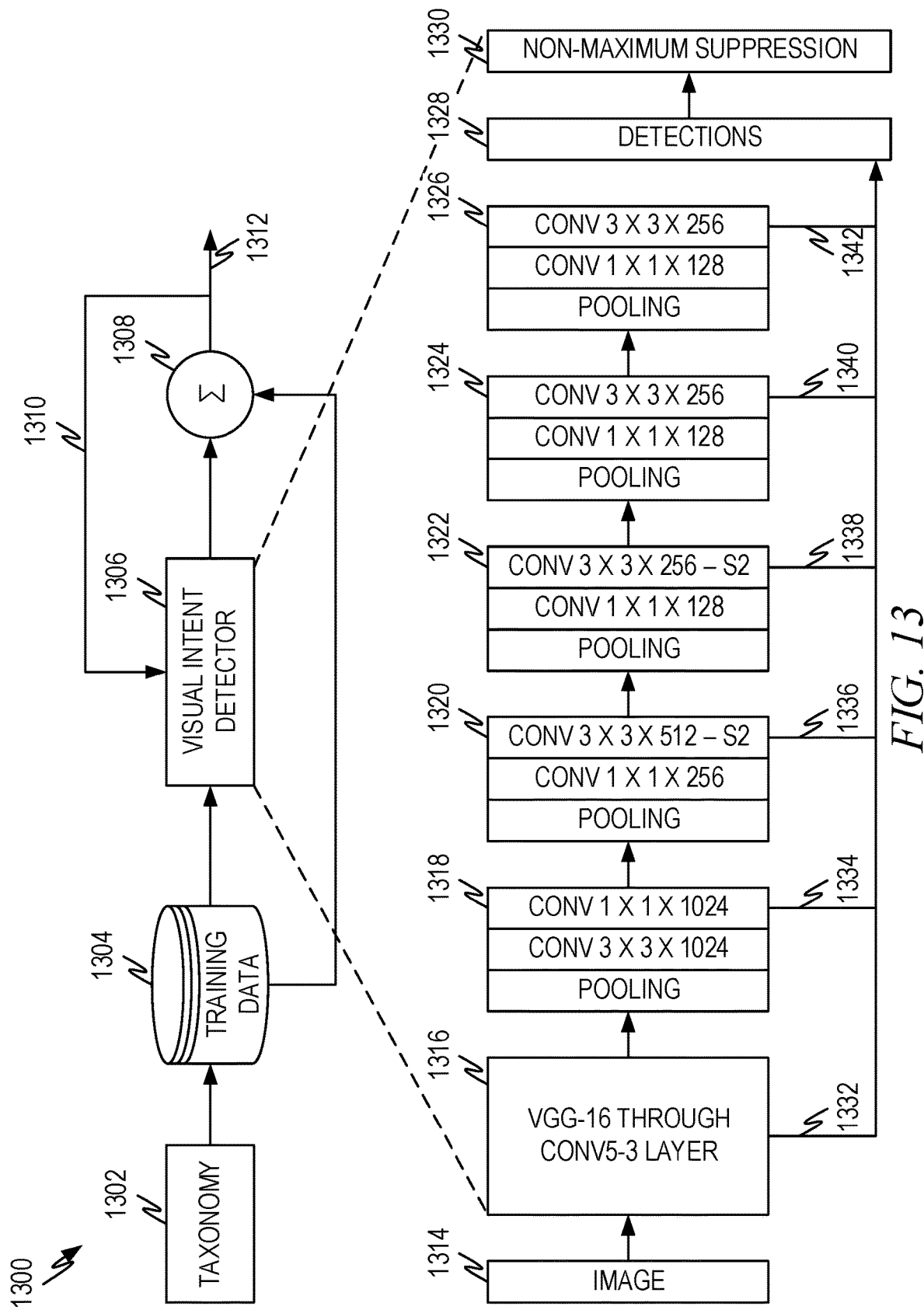
FIG. 13 is a representative diagram illustrating training of a representative visual intent detection model according to some aspects of the present disclosure.

FIG. 13 is a representative diagram illustrating training 1300 of a representative visual intent detection model according to some aspects of the present disclosure. The diagram also illustrates a suitable architecture for a visual intent detector that can be used with the embodiments described herein.

A suitable architecture for a visual intent detector as described in embodiments of the present disclosure can include a convolutional neural network as illustrated in FIG. 13. The network can comprise a plurality of layers as illustrated. Batch normal and ReLU layers are not shown in the diagram but will exist in implementations as known by those skilled in the art.

Figure 14:
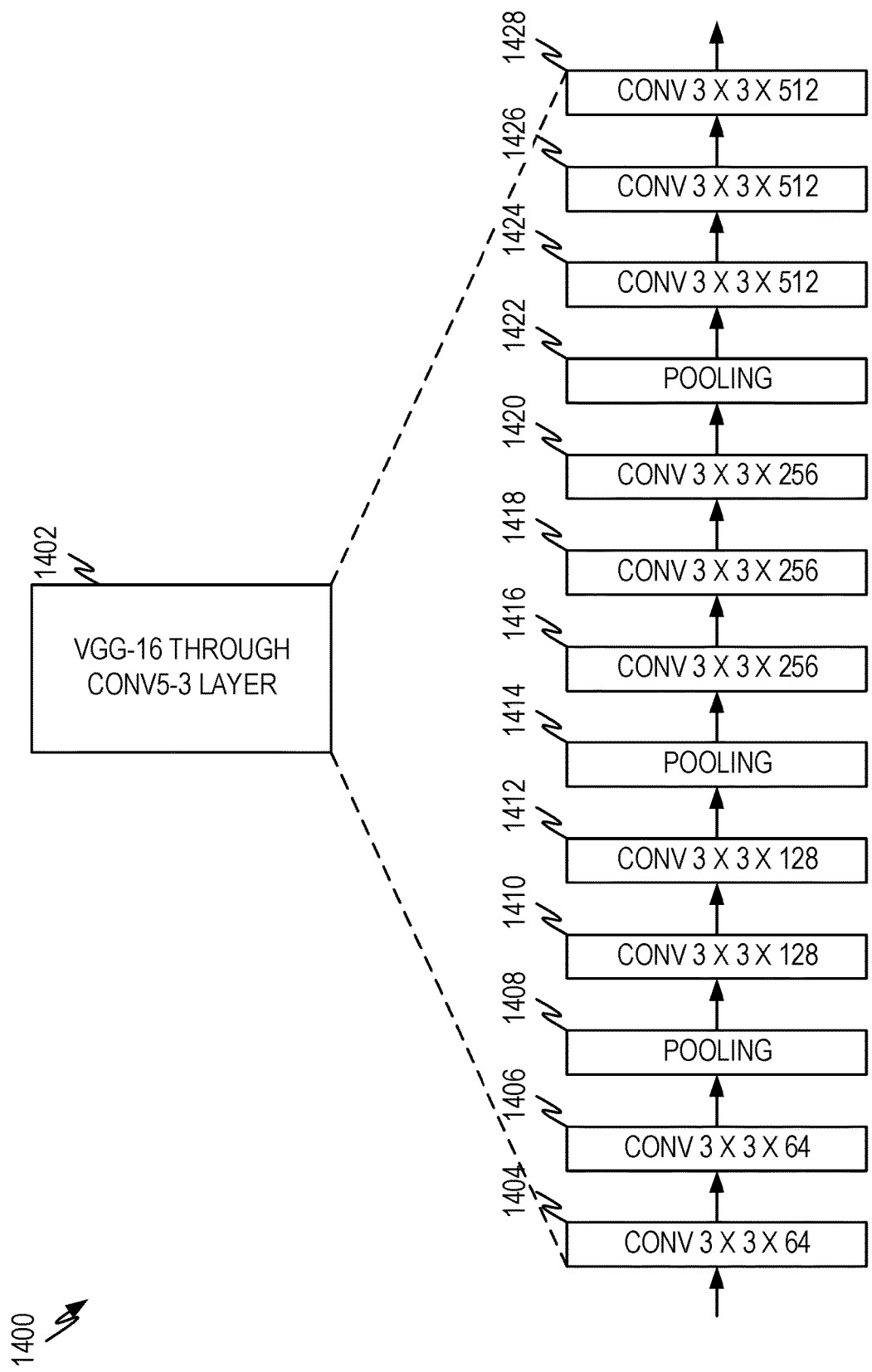
FIG. 14 is a representative diagram illustrating a portion of a representative visual intent detection model according to some aspects of the present disclosure.

The first set of layers 1316 in the neural network can comprise a portion of the layers used in a VGG-16 detector. The VGG-16 detector architecture is described in *Very Deep Convolutional Networks for Large-Scale Image Recognition* by Karen Simonyan and Andrew Zisserman (available at arXiv:1409.1556v6 [cs.CV] 10 Apr. 2015) and which is incorporated herein by reference. The layers of the VGG-16 detector that are part of the first set of layers 1316 are through the conv5-3 layers as illustrated in FIG. 14. All convolutional layers are stride 1 except where noted.

The second set of layers 1318 comprises a pooling layer, a convolutional 3×3×1024 layer, and a convolutional 1×1× 1024 layer. The third set of layers 1320 comprises a pooling layer, a convolutional 1×1×256 layer, and a convolutional 3×3×512 stride 2 layer. The fourth set of layers 1322 comprises a pooling layer, a convolutional 1×1×128 layer, and a convolutional 3×3×256 stride 2 layer. The fifth set of layers 1324 comprises a pooling layer, a convolutional 1×1×128 layer, and a convolutional 3×3×256 layer. The sixth set of layers 1326 comprises a pooling layer, a convolutional 1×1×128 layer, and a convolutional 3×3×256 layer.

All the sets of layers act as feature extractors and the outputs are tapped off where shown 1332, 1334, 1336, 1338, 1340, 1342 after the last layer in each set and fed into a plurality of detector layers 1328. Additionally, a suppression model can be added as discussed which is illustrated as non-maximum suppression layer 1330.

The training process is illustrated where the selected taxonomy 1302, such as the taxonomy of Table 1 is used in conjunction with training image data 1304 to train the visual intent detector. Training proceeds by presenting training data to the visual intent detector 1306, evaluating the output against what should have been produced 1308 and then adjusting the weights 1310 according to one or more error functions until the model converges 1312.

Mechanisms to train the visual intent detector according to the outlined model are known and can be used. The training process tunes various parameters in the visual intent detector, including number and scales of anchor boxes, number of additional output layers, online hard example mining (OHEM), IOU threshold in training, and so forth. In addition to, or as an alternative to, existing training mechanisms, a parameter tuning tool that can train a selection of models with different combination of parameters can also be used. For example, the approach taken in U.S. application Ser. No. 15/883,686 entitled "Machine Learning Hyperparameter Tuning Tool" (incorporated herein by reference) can be an efficient way to tune various parameters. Other tuning tools also exist and can be used. If a tuning tool is used to evaluate several different models, the model with the best weighted-mAP results can be selected for use.

In this case, the goal is not only to train the model to provide bounding boxes but also to train the model to present the subjects (along with classification labels and bounding boxes) that the users are likely to utilize in further processing as described herein. For example, in the visual search context, is a user likely to want to select the subject as the target of a visual search. Thus, during training, search intent labels can be attached to appropriate image subjects along with a bounding box and classification label. The search intent label identifies a subject that will be of interest to the user in one or more scenarios. During training the search intent labels can be used as positive training examples for subjects of an image. In this way the search intent detector is trained to attach bounding boxes and classification labels to search intent labeled subjects in an image.

Additionally, as described above, a suppression model can be utilized to suppress one or more subjects in an image, even when they are labeled with a search intent label. The suppression model is based on individual search intent scores that are attached to subjects in the source image. The search intent detection model is trained to produce a search intent score associated with each of the search intent labeled subjects in the image. The search intent score represents a likelihood that the subject is of interest. As noted above, a subject is of interest if it is likely to be a subject used in a scenario. For example, in a visual search scenario, how likely is it that the user will want to select the subject as the target of a visual search.

The suppression model is then used to suppress subjects or not suppress subjects based on their associated search intent score. For example, the suppression model can suppress all but the highest score. In another example, the suppression model can select the top K subjects with the highest scores. In yet another example, the suppression model can select all subjects with an associated score that exceeds a threshold value. Thus, the suppression model can be tuned to suppress subjects based on their associated search intent score.

FIG. 14 is a representative diagram 1400 illustrating a portion of a representative visual intent detection model according to some aspects of the present disclosure. As noted above, the first set of layers of an appropriate visual intent detector utilizes a subset of the layers of a VGG-16 detector 1402. This diagram illustrates the subset of layers that are used. The layers are listed in Table 3 below along with their reference numbers.

TABLE 3

Subset of VGG-16 layers

| Layer | FIG. 14 Reference Number |
| --- | --- |
| Convolutional 3 × 3 × 64 | 1404 |
| Convolutional 3 × 3 × 64 | 1406 |
| Pooling | 1408 |
| Convolutional 3 × 3 × 128 | 1410 |
| Convolutional 3 × 3 × 128 | 1412 |
| Pooling | 1414 |
| Convolutional 3 × 3 × 256 | 1416 |
| Convolutional 3 × 3 × 256 | 1418 |
| Convolutional 3 × 3 × 256 | 1420 |
| Pooling | 1422 |
| Convolutional 3 × 3 × 512 | 1424 |
| Convolutional 3 × 3 × 512 | 1426 |
| Convolutional 3 × 3 × 512 | 1428 |

The pooling layers can be a maxpooling layer as described in the *Very Deep Convolutional Networks for Large-Scale Image Recognition paper*. Additional batch normal and/or ReLU layers can be added as known by those of skill in the art.

Example Machine Architecture and Machine-Readable Medium

Figure 15:
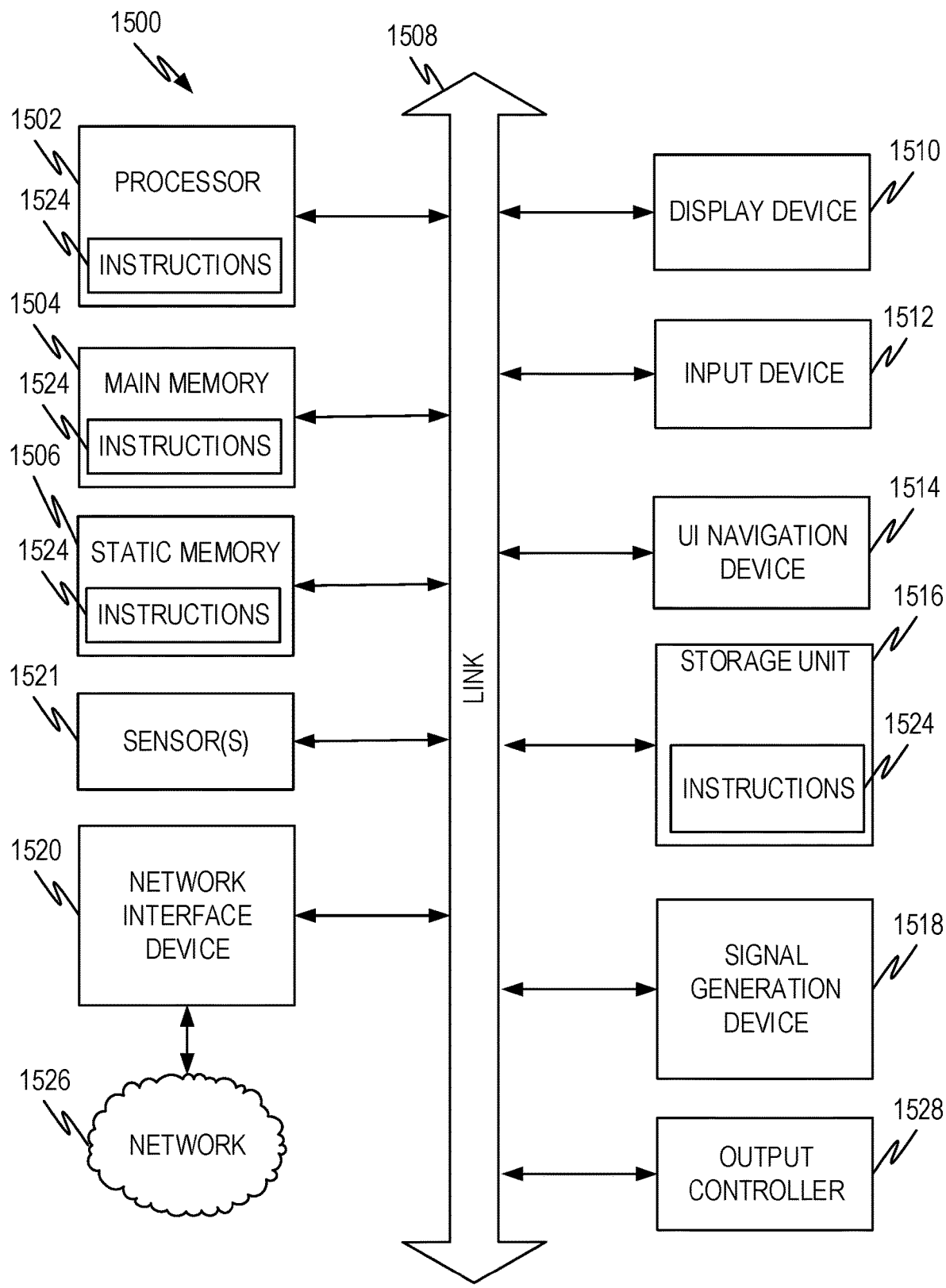
FIG. 15 illustrates a representative machine architecture suitable for implementing the systems and other aspects disclosed herein or for executing the methods disclosed herein.

FIG. 15 illustrates a representative machine architecture suitable for implementing the systems and other aspects disclosed herein or for executing the methods disclosed herein. The machine of FIG. 15 is shown as a standalone device (such as the mobile devices described herein), which is suitable for implementation of the concepts above. For the server and/or services aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 15 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1500 includes at least one processor 1502 (e.g., a central processing unit (CPU), a graphics processing unit (GPU), advanced processing unit (APU), or combinations thereof), one or more memories such as a main memory 1504, a static memory 1506, or other types of memory, which communicate with each other via link 1508. Link 1508 may be a bus or other type of connection channel. The machine 1500 may include further optional aspects such as a graphics display unit 1510 comprising any type of display. The machine 1500 may also include other optional aspects such as an alphanumeric input device 1512 (e.g., a keyboard, touch screen, and so forth), a user interface (UI) navigation device 1514 (e.g., a mouse, trackball, touch device, and so forth), a storage unit 1516 (e.g., disk drive or other storage device(s)), a signal generation device 1518 (e.g., a speaker), sensor(s) 1521 (e.g., global positioning sensor, accelerometer(s), microphone(s), camera(s), an eye tracking subsystem, and so forth), output controller 1528 (e.g., wired or wireless connection to connect and/or communicate with one or more other devices such as a universal serial bus (USB), near field communication (NFC), infrared (IR), serial/parallel bus, etc.), and a network interface device 1520 (e.g., wired and/or wireless) to connect to and/or communicate over one or more networks 1526.

Rather than the more conventional microprocessor, Neural Network chips can be used to implement embodiments of the present disclosure. Neural Network chips are specialized chips designed to execute various forms of neural networks and can be used in the MRC models or other machine learning models that are utilized in the embodiments. As such, they are suitable for use in implementing aspects of the present disclosure such as the machine learning models and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 1504, 1506, and/or memory of the processor(s) 1502) and/or storage unit 1516 may store one or more sets of instructions and data structures (e.g., software) 1524 embodying or utilized by any one or more of the methodologies or functions described herein. These instructions, when executed by processor(s) 1502 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method, comprising:
receiving an image having at least one subject;
submitting the image to a trained visual intent classifier, the trained visual intent classifier being trained as a multilabel classifier;
receiving from the trained visual intent classifier at least one classification label from a taxonomy used to train the multilabel classifier, the at least one classification label corresponding to the at least one subject of the image;
based on the at least one classification label, initiating at least one of:
triggering a query related to the image;
causing presentation of information to help the user formulate a query related to the image;
initiating a visual search using a data store comprising images having classification labels that comprise the at least one classification label associated with the image; and
initiating visual intent detection on the image.

Example 2

The method of example 1 wherein the taxonomy includes categories comprising:
animal;
two-dimensional artwork;
three-dimensional artwork;
barcode;
book;
cosmetics;
electronics;
face;
people;
fashion;
food_or_drink;
gift;
home_or_office_furnishing_or_decor;
logo;
man_made_structure;
map;
money;
musical_instrument;
nature_object;
newspaper;
plant;
productivity;
school_or_office_supply;
sports_or_outdoor_accessories;
tatoo;
toy;
training_workout_item;
vehicle;
packaged_product; and
other.

Example 3

The method of example 1 wherein the trained visual intent classifier comprises a MobileNet backbone trained using an error function comprising two multilabel classification losses, a first multilabel classification loss being a multilabel elementwise sigmoid loss and a second multilabel classification loss being a multilabel softmax loss.

Example 4

The method of example 1 wherein the visual intent classifier is trained using a cross-entropy loss given by $$E = \frac{-1}{n} \sum_{n=1}^{N} [p_n \log \hat{p}_n + (1 - p_n) \log(1 - \hat{p}_n)].$$

Example 5

The method of example 1 wherein triggering a query comprises:
sending the at least one classification label associated with the image to a user device; and
receiving from the user device a query to be executed by a search service.

Example 6

The method of example 1 wherein causing presentation of information to help the user formulate a query related to the image comprises:
selecting a plurality of potential activities based on the at least one classification label associated with the image;
sending the plurality of potential activities to a user device;
receiving from the user device, selection of at least one activity of the plurality of potential activities;
formulating a query based on the selected at least one activity; and
sending the query to a query engine for execution.

Example 7

The method of example 1 wherein initiating a visual search using a data store comprising images having classification labels that comprise the at least one classification label associated with the image comprises:
selecting a subset of images from the data store, each image in the subset having at least one associated classification label that matches the at least one classification label associated with the image;
performing a visual search on the subset of images;
ranking images that are indicated as a match by the visual search; and
returning a subset of the ranked images.

Example 8

The method of example 1 wherein initiating visual intent detection on the image comprises:
selecting a visual intent detection mode, the visual intent detection mode selected from a mode that identifies a plurality of subjects in the image and a mode that identifies a single subject in the image;
selecting a trained visual intent detection model corresponding to the visual intent detection mode;
presenting the image to the trained visual intent detection model;
receiving from the trained visual intent detection model a number of bounding boxes that correspond to the visual intent detection mode, each of the bounding boxes substantially bounding a corresponding subject and each of the bounding boxes comprising at least one associated classification label which identifies the corresponding subject; and
returning to a user device the image comprising the bounding boxes and the at least on associated classification label.

Example 9

The method of example 8 wherein the trained visual intent detection model is trained using both web images and images collected from imaging devices.

Example 10

A system comprising:
a processor and device-storage media having executable instructions which, when executed by the processor, implement visual intent classification, visual intent detection, or both, comprising:
receiving a request comprising an image having at least one associated subject;
when the request is for visual intent classification, performing operations comprising:
submitting the image to a trained visual intent classifier, the trained visual intent classifier being trained as a multilabel classifier;
receiving from the trained visual intent classifier at least one classification label from a taxonomy used to train the multilabel classifier, the at least one classification label corresponding to the at least one subject of the image;
based on the at least one classification label, initiating at least one of:
triggering a query related to the image;
causing presentation of information to help the user formulate a query related to the image;
initiating a visual search using a data store comprising images having classification labels that comprise the at least one classification label associated with the image; and
initiating visual intent detection on the image; and
when the request is for visual intent detection, performing operations comprising:
presenting the image to the trained visual intent detection model, the trained visual intent detection model being trained in one of two training modes, the first training mode identifying a plurality of subjects in the image and the second training mode a single subject in the image;
receiving from the trained visual intent detection model a number of bounding boxes that correspond to the training mode, each of the bounding boxes substantially bounding a corresponding subject and each of the bounding boxes comprising at least one associated classification label which identifies the corresponding subject; and returning to a user device the image comprising the bounding boxes and the at least on associated classification label.

Example 11

The system of example 10 wherein the trained visual intent classifier comprises a MobileNet backbone trained using an error function comprising two multilabel classification losses, a first multilabel classification loss being a multilabel elementwise sigmoid loss and a second multilabel classification loss being a multilabel softmax loss.

Example 12

The system of example 10 wherein the visual intent classifier is trained using a cross-entropy loss given by $$E = \frac{-1}{n} \sum_{n=1}^{N} [p_n \log \hat{p}_n + (1 - p_n) \log(1 - \hat{p}_n)].$$

Example 13

The system of example 10 wherein triggering a query comprises:
sending the at least one classification label associated with the image to a user device; and
receiving from the user device a query to be executed by a search service.

Example 14

The system of example 10 wherein causing presentation of information to help the user formulate a query related to the image comprises:
selecting a plurality of potential activities based on the at least one classification label associated with the image;
sending the plurality of potential activities to a user device;
receiving from the user device, selection of at least one activity of the plurality of potential activities;
formulating a query based on the selected at least one activity; and
sending the query to a query engine for execution.

Example 15

The system of example 10 wherein initiating a visual search using a data store comprising images having classification labels that comprise the at least one classification label associated with the image comprises:

selecting a subset of images from the data store, each image in the subset having at least one associated classification label that matches the at least one classification label associated with the image;
performing a visual search on the subset of images;
ranking images that are indicated as a match by the visual search; and
returning a subset of the ranked images.

Example 16

A computer implemented method, comprising:
receiving a request comprising an image having at least one associated subject for visual intent classification, visual intent detection, or both (202, 302, 402, 502, 602, 702, 902, 1002, 1102, 1202);
when the request is for visual intent classification, performing operations comprising:
submitting the image to a trained visual intent classifier, the trained visual intent classifier being trained as a multilabel classifier (112, 204, 304, 404, 504, 604, 704);
receiving from the trained visual intent classifier at least one classification label (208, 308, 408, 508, 608, 708) from a taxonomy (212, 802) used to train the multilabel classifier, the at least one classification label corresponding to the at least one subject of the image;
based on the at least one classification label, initiating at least one of:
triggering a query related to the image (310, 312, 610);
causing presentation of information to help the user formulate a query related to the image (314, 712);
initiating a visual search using a data store comprising images having classification labels that comprise the at least one classification label associated with the image (514); and
initiating visual intent detection on the image (904, 1012, 1104, 1220, 1306); and
when the request is for visual intent detection, performing operations comprising:
presenting the image to the trained visual intent detection model (904, 1012, 1104, 1220, 1306), the trained visual intent detection model being trained in one of two training modes, the first training mode identifying a plurality of subjects in the image (910) and the second training mode a single subject in the image (906);
receiving from the trained visual intent detection model a number of bounding boxes (908, 912, 914, 1214, 1216, 1218) that correspond to the training mode, each of the bounding boxes substantially bounding a corresponding subject and each of the bounding boxes comprising at least one associated classification label which identifies the corresponding subject; and
returning to a user device the image comprising the bounding boxes and the at least on associated classification label (906, 910, 1014, 1212).

Example 17

The method of example 1 wherein the taxonomy includes categories comprising:
animal;
two-dimensional artwork;
three-dimensional artwork;
barcode;
book;
cosmetics;
electronics;
face;
people;
fashion;
food_or_drink;
gift;
home_or_office_furnishing_or_decor;
logo;
man_made_structure;
map;
money;
musical_instrument;
nature_object;
newspaper;
plant;
productivity;
school_or_office_supply;
sports_or_outdoor_accessories;
tatoo;
toy;
training_workout_item;
vehicle;
packaged_product; and
other.

Example 18

The method of example 16 or 17 wherein the trained visual intent classifier comprises a MobileNet backbone trained using an error function comprising two multilabel classification losses, a first multilabel classification loss being a multilabel elementwise sigmoid loss and a second multilabel classification loss being a multilabel softmax loss.

Example 19

The method of example 16, 17, or 18 wherein the visual intent classifier is trained using a cross-entropy loss given by $$E = \frac{-1}{n} \sum_{n=1}^{N} [p_n \log \hat{p}_n + (1 - p_n) \log(1 - \hat{p}_n)].$$

Example 20

The method of example 16, 17, 18, or 19 wherein triggering a query comprises:
sending the at least one classification label associated with the image to a user device; and
receiving from the user device a query to be executed by a search service.

Example 21

The method of example 16, 17, 18, 19, or 20 wherein causing presentation of information to help the user formulate a query related to the image comprises:
selecting a plurality of potential activities based on the at least one classification label associated with the image;
sending the plurality of potential activities to a user device;
receiving from the user device, selection of at least one activity of the plurality of potential activities;
formulating a query based on the selected at least one activity; and
sending the query to a query engine for execution.

Example 22

The method of example 16, 17, 18, 19, 20, or 21 wherein initiating a visual search using a data store comprising images having classification labels that comprise the at least one classification label associated with the image comprises:
  selecting a subset of images from the data store, each image in the subset having at least one associated classification label that matches the at least one classification label associated with the image;
  performing a visual search on the subset of images;
  ranking images that are indicated as a match by the visual search; and
  returning a subset of the ranked images.

Example 23

The method of example 16, 17, 18, 19, 20, 21, or 22 wherein when the request is for visual intent detection the visual intent detection model is trained using the first training mode.

Example 24

The method of example 16, 17, 18, 19, 20, 21, or 22 wherein when the request is for visual intent detection the visual intent detection model is trained using the second training mode.

Example 25

The method of example 16, 17, 18, 19, 20, 21, 22, 23, or 24 wherein the trained visual intent detection model is trained using both web images and images collected from imaging devices.

Example 26

The method of example 16, 17, 18, 19, 20, 21, 22, 23, 24, or 25 wherein the visual intent detection model comprises:
  a first series of convolutional layers that represent a subset of layers of a VGG-16 detection model;
  a second series of convolutional layers comprising:
  a 3×3×1024 convolutional layer; and
  a 1×1×1024 convolutional layer;
  a detection layer; and
  a non-maximum suppression layer.

Example 27

The method of example 26 wherein the second series of convolutional layers further comprise:
  a 3×3×512 convolutional layer;
  a 1×1×256 convolutional layer;
  a 3×3×256 convolutional layer; and
  a 1×1×128 convolutional layer.

Example 28

The method of example 16, 17, 18, 19, 20, 21, 22, 25, 26, or 27 wherein the visual intent detector is trained to identify a plurality of subjects in the image and wherein the operations further comprise passing at least one classification label and an associated bounding box to a suppression model, the suppression suppressing at least one classification label along with its associated bounding box.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method, comprising:
  receiving an image as a query at a computer-implemented search engine, wherein the image includes an object;
  in response to receiving the image as the query, submitting the image to a multilabel classifier of the computer-implemented search engine, where the multilabel classifier is configured to:
    identify a plurality of objects in the image;
    place bounding boxes in the image, where each of the bounding boxes substantially bounds a corresponding object; and
    assign at least one classification label to each bounding box to identify the corresponding objects in the images;
  passing at least one classification label and an associated bounding box to a trained suppression model of the computer-implemented search engine, the trained suppression model computing scores for the bounding box and suppressing at least one classification label along with its associated bounding box based upon the scores;
  based on an unsuppressed classification label, selecting, by the computer-implemented search engine, a user intent scenario from amongst a predefined set of user intent scenarios, wherein the user intent scenario in the predefined set of user intent scenarios is selectable due to the classification label being assigned to the user intent scenario;
  generating, by the computer-implemented search engine, a query suggestion for review by a user who issued the image as the query, wherein the query suggestion is generated based upon the selected user intent scenario;
  subsequent to generating the query suggestion, receiving, by the computer-implemented search engine, an indication that the query suggestion has been selected by the user; and
  providing, by the computer-implemented search engine, output that is based upon the user intent scenario.

2. The method of claim 1 wherein the multilabel classifier comprises a MobileNet backbone trained using an error function comprising two multilabel classification losses, a first multilabel classification loss being a multilabel elementwise sigmoid loss and a second multilabel classification loss being a multilabel softmax loss.

3. The method of claim 1 wherein the multilabel classifier is trained using a cross-entropy loss given by $$E = \frac{-1}{n} \sum_{n=1}^{N} [p_n \log \hat{p}_n + (1 - p_n) \log(1 - \hat{p}_n)].$$

4. The method of claim 1 wherein the user intent scenario is a visual search, the method further comprising outputting images that have the classification label assigned thereto.

5. The method of claim 1 wherein multiple classification labels for the image are received from the multilabel classifier, the method further comprising selecting the classification label from amongst the multiple classification labels based upon a determination that the object is of interest to the user.

6. The method of claim 1 wherein the user intent scenario is performance of a search, wherein a query that includes the classification is constructed, the method further comprising outputting search results identified based upon the query.

7. A computing system comprising:
a processor; and
memory storing instructions that, when executed by the processor, cause the processor to perform acts comprising:
receiving an image as a query by a computer-implemented search engine, wherein the image includes an object;
in response to receiving the image as the query, submitting the image to a multilabel classifier, where the multilabel classifier is configured to:
identify a plurality of objects in the image;
place bounding boxes in the image, where each of the bounding boxes substantially bounds a corresponding object; and
assign at least one classification label to each bounding box to identify the corresponding objects in the images;
passing classification labels and associated bounding boxes to a trained suppression model, where the trained suppression model computes scores for the bounding boxes and the associated classification labels and suppresses a classification label and its associated bounding box based upon the scores;
based on an unsuppressed classification label, selecting a user intent scenario from amongst a predefined set of user intent scenarios, wherein the user intent scenario in the predefined set of user intent scenarios is selectable due to the unsuppressed classification label being assigned to the user intent scenario;
generating a query suggestion for review by a user who issued the image as the query, wherein the query suggestion is generated based upon the selected user intent scenario;
subsequent to generating the query suggestion, receiving, by the search engine, an indication that the query suggestion has been selected by the user; and
providing, by the search engine, output that is based upon the user intent scenario.

8. The computing system of claim 7 wherein the multilabel classifier comprises a MobileNet backbone trained using an error function comprising two multilabel classification losses, a first multilabel classification loss being a multilabel elementwise sigmoid loss and a second multilabel classification loss being a multilabel softmax loss.

9. The computing system of claim 7 wherein the multilabel classifier is trained using a cross-entropy loss given by $$E = \frac{-1}{n} \sum_{n=1}^{N} [p_n \log \hat{p}_n + (1 - p_n) \log(1 - \hat{p}_n)].$$

10. The computing system of claim 7 wherein the user intent scenario is a visual search, the acts further comprising outputting images that have the classification label assigned thereto.

11. The computing system of claim 7 wherein multiple classification labels for the image are received from the multilabel classifier, the acts further comprising selecting the classification label from amongst the multiple classification labels based upon a determination that the object is of interest to the user.

12. The computing system of claim 7 wherein the user intent scenario is performance of a search, wherein a query that includes the classification is constructed, the acts further comprising outputting search results identified based upon the query.

13. A machine-storage medium comprising instructions that, when executed by a processor, cause the processor to perform acts comprising:
receiving an image as a query by a computer-implemented search engine, wherein the image includes an object;
in response to receiving the image as the query, submitting the image to a multilabel classifier, where the multilabel classifier is trained to:
identify objects in the image;
placing bounding boxes in the image, where the bouncing boxes respectfully bound the objects in the image;
assign classification labels to the bounding boxes, where the classification labels identify the respective objects in the images;
passing the bounding boxes and respective classification labels to a trained suppression model, where the trained suppression model computes scores for the bounding boxes and respective classification labels, and further where a classification label and its associated bounding box is suppressed based upon the scores computed by the suppression model;
based on an unsuppressed classification label, selecting a user intent scenario from amongst a predefined set of user intent scenarios, wherein the user intent scenario in the predefined set of computing tasks is selectable due to the unsuppressed classification label assigned to the user intent scenario;
generating a query suggestion for review by a user who issued the image as the query, wherein the query suggestion is generated based upon the selected user intent scenario;
subsequent to generating the query suggestion, receiving, by the search engine, an indication that the query suggestion has been selected by the user; and
providing, by the search engine, output that is based upon the user intent scenario.

14. The machine-storage medium of claim 13 wherein the multilabel classifier comprises a MobileNet backbone trained using an error function comprising two multilabel classification losses, a first multilabel classification loss being a multilabel elementwise sigmoid loss and a second multilabel classification loss being a multilabel softmax loss.

15. The machine-storage medium of claim 13 wherein the multilabel classifier is trained using a cross-entropy loss given by $$E = \frac{-1}{n} \sum_{n=1}^{N} [p_n \log \hat{p}_n + (1 - p_n) \log(1 - \hat{p}_n)].$$

16. The machine-storage medium of claim 13 wherein the user intent scenario is a visual search, the acts further comprising outputting images that have the classification label assigned thereto.

17. The machine-storage medium of claim 13 wherein multiple classification labels for the image are received from the multilabel classifier, the acts further comprising selecting the classification label from amongst the multiple classification labels based upon a determination that the object is of interest to the user.

* * * * *